US012333972B2

(12) United States Patent
Mizusako et al.

(10) Patent No.: US 12,333,972 B2
(45) Date of Patent: Jun. 17, 2025

(54) PROJECTION-TYPE DISPLAY APPARATUS AND METHOD FOR CONTROLLING PROJECTION-TYPE DISPLAY APPARATUS

(71) Applicant: SEIKO EPSON CORPORATION, Tokyo (JP)

(72) Inventors: Kazuhisa Mizusako, Shiojiri (JP); Toru Aoki, Shiojiri (JP); Yusuke Komuro, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/613,511

(22) Filed: Mar. 22, 2024

(65) Prior Publication Data

US 2024/0321159 A1 Sep. 26, 2024

(30) Foreign Application Priority Data

Mar. 23, 2023 (JP) ................................ 2023-046433

(51) Int. Cl.
*G09G 3/00* (2006.01)
*G09G 3/20* (2006.01)
*G09G 3/36* (2006.01)

(52) U.S. Cl.
CPC ............. *G09G 3/007* (2013.01); *G09G 3/002* (2013.01); *G09G 3/2007* (2013.01); *G09G 3/3607* (2013.01)

(58) Field of Classification Search
None
See application file for complete search history.

(56) References Cited

U.S. PATENT DOCUMENTS

2020/0213567 A1 7/2020 Okada et al.
2021/0076015 A1* 3/2021 Hosaka ................. G09G 3/002

FOREIGN PATENT DOCUMENTS

JP 2020-107984 A 7/2020

* cited by examiner

*Primary Examiner* — Nicholas J Lee
(74) *Attorney, Agent, or Firm* — Oliff PLC

(57) ABSTRACT

A projection-type display apparatus including a liquid crystal panel including a plurality of panel pixels, an optical path shifting element configured to shift a position of a projection pixel for each of unit periods, included in one frame period, and a display control circuit configured to control the liquid crystal panel and the optical path shifting element. The display control circuit supplies a data signal to the plurality of panel pixels per the unit period, supplies a signal based on pixel data, as the data signal, to a peripheral panel pixel arranged at a periphery among the plurality of panel pixels in a unit period as a part in one frame period, and supplies a signal having a gray scale level equal to or less than a threshold value as the data signal in a unit period other than the unit period as the part in the one frame period.

6 Claims, 13 Drawing Sheets

PROJECTION-TYPE DISPLAY APPARATUS AND METHOD FOR CONTROLLING PROJECTION-TYPE DISPLAY APPARATUS

The present application is based on, and claims priority from JP Application Serial Number 2023-046433, filed Mar. 23, 2023, the disclosure of which is hereby incorporated by reference herein in its entirety.

BACKGROUND

1. Technical Field

The present disclosure relates to a projection-type display apparatus device and a method for controlling the projection-type display apparatus.

2. Related Art

In a projection-type display apparatus that projects image light generated by a liquid crystal panel or the like onto a screen or the like, a technique is known that artificially increases resolution by an optical path shifting element. More specifically, in the projection-type display apparatus, one frame period is divided into a plurality of unit periods, and a projection position of one panel pixel in the liquid crystal panel is shifted for each of the plurality of unit periods, to express a gray scale level designated by a plurality of pixel data in video data (see JP 2020-107984 A, for example).

However, in the technique described above, there was a problem in that the video data is visually recognized while a part thereof is missing depending on the projection position.

SUMMARY

In order to solve the above-described problems, a projection-type display apparatus according to an aspect of the present disclosure includes a liquid crystal panel including a plurality of panel pixels, an optical path shifting element configured to shift a position of a projection pixel projected from the plurality of panel pixels for each of k unit periods from a first unit period to a k-th unit period, where k is an integer equal to or greater than 2, included in one frame period, and a display control circuit configured to control the liquid crystal panel and the optical path shifting element, wherein the display control circuit supplies a data signal to the plurality of panel pixels per the unit period, supplies a signal based on pixel data of a video pixel constituting a video image, as the data signal, to a peripheral panel pixel arranged at a periphery among the plurality of panel pixels in a unit period as a part in one frame period of a first frame period and a second frame period, and supplies a signal having a gray scale level equal to or less than a threshold value as the data signal in a unit period other than the unit period as the part in the one frame period.

BRIEF DESCRIPTION OF THE DRAWINGS

FIG. 10 is a diagram illustrating a relationship between an array of video pixels and an array of the panel pixels, and the like.

DESCRIPTION OF EMBODIMENTS

An electro-optical device according to embodiments will be described below with reference to the accompanying drawings. Note that in each of the drawings, dimensions and scale of each part are made different from actual ones as appropriate. Further, embodiments described below are suitable specific examples, and various technically preferable limitations are applied, but the scope of the disclosure is not limited to these embodiments unless they are specifically described in the following description as limiting the disclosure.

Figure 1:
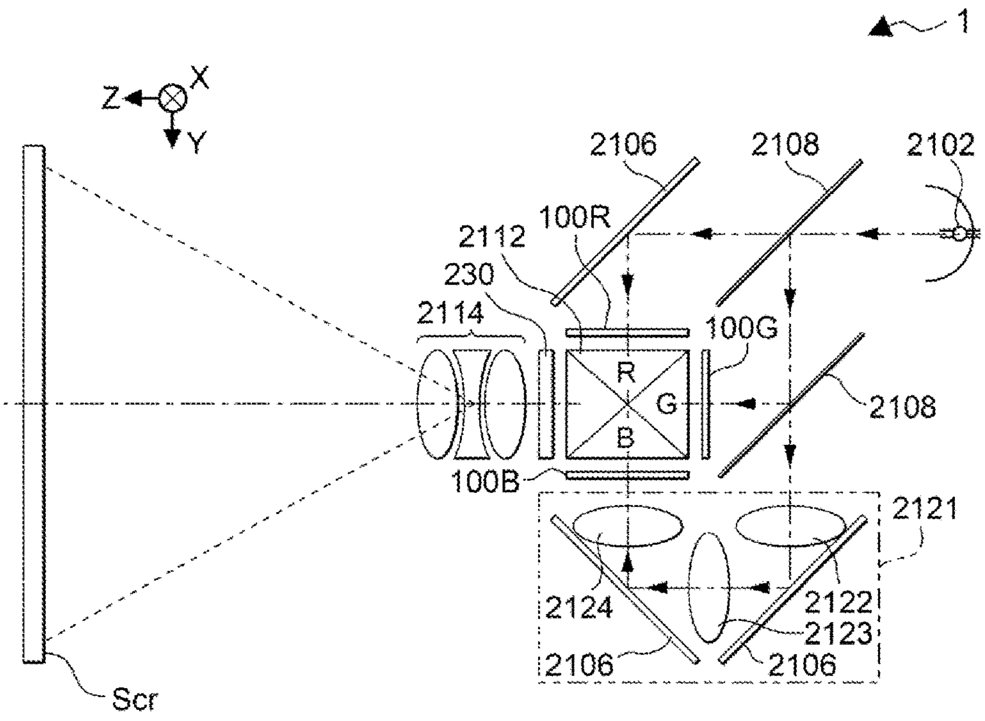
FIG. 1 is a diagram illustrating a projection-type display apparatus according to a first embodiment.

FIG. 1 is a diagram illustrating an optical configuration of a projection-type display apparatus 1 according to an embodiment. As illustrated in the drawing, the projection-type display apparatus 1 includes liquid crystal panels 100R, 100G, and 100B. Further, a lamp unit 2102 including a white light source such as a halogen lamp is provided inside the projection-type display apparatus 1. Projection light emitted from the lamp unit 2102 is split into three primary colors of red (R), green (G), and blue (B) by three mirrors 2106 and two dichroic mirrors 2108 arranged inside the projection-type display apparatus 1. Of the light of the primary colors, light of R, light of G, and light of B are incident on the liquid crystal panel 100R, the liquid crystal panel 100G, and the liquid crystal panel 100B, respectively.

Note that since an optical path of B is longer than each of optical paths of R and G, it is necessary to prevent a loss in the B optical path. Thus, a relay lens system 2121 including an incidence lens 2122, a relay lens 2123, and an emission lens 2124 is provided at the B optical path.

The liquid crystal panel 100R includes a plurality of pixel circuits. Each of the plurality of pixel circuits includes a liquid crystal element. As described below, by the liquid crystal element of the liquid crystal panel 100R being driven based on a data signal corresponding to R, the liquid crystal panel 100R comes to have a transmittance corresponding to the data signal. Thus, in the liquid crystal panel 100R, a transmitted image of R is generated by individually controlling the transmittance of the liquid crystal element. Similarly, in the liquid crystal panel 100G, a transmitted image of G is generated based on a data signal corresponding to G, and in the liquid crystal panel 100B, a transmitted image of B is generated based on a data-signal corresponding to B.

The transmitted images of the colors generated by the liquid crystal panels 100R, 100G, and 100B, respectively, are incident on a dichroic prism 2112 from three directions. At the dichroic prism 2112, the light of R and the light of B are refracted at 90 degrees, whereas the light of G travels in a straight line. Thus, the dichroic prism 2112 combines the images of the respective colors. A composite image generated by the dichroic prism 2112 is incident on a projection lens 2114 via an optical path shifting element 230.

The projection lens 2114 enlarges and projects the composite image transmitted through the optical path shifting element 230, onto a screen Scr.

The optical path shifting element 230 shifts the composite image emitted from the dichroic prism 2112. More specifically, the optical path shifting element 230 shifts the image projected onto the screen Scr in a left-right direction and/or in an up-down direction with respect to a projection surface.

Note that, while the transmitted images by the liquid crystal panels 100R and 100B are projected after being reflected by the dichroic prism 2112, the transmitted image by the liquid crystal panel 100G travels in a straight line and is projected. Thus, the respective transmitted images of the liquid crystal panels 100R and 100B are laterally inverted with respect to the transmitted image of the liquid crystal panel 100G.

For convenience of description, with the projection surface of the screen Scr viewed from the projection-type display apparatus 1, the left-right direction is defined as an X-axis and the up-down direction is defined as a Y-axis. Note that, of the left-right direction along the X-axis, a right direction is referred to as an X direction, and a left direction is referred to as a direction opposite to the X direction. Further, of the up-down direction along the Y-axis, a downward direction is referred to as a Y direction, and an upward direction is referred to as a direction opposite to the Y direction. A projection direction of the projection-type display apparatus 1 is defined as a Z direction.

Figure 2:
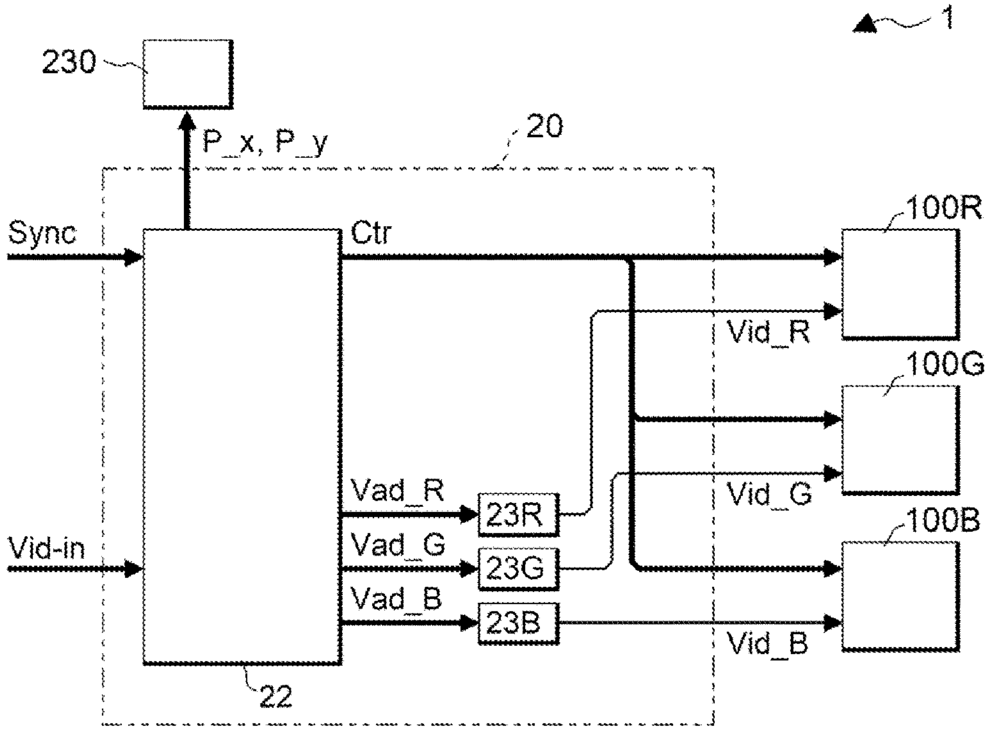
FIG. 2 is a block diagram illustrating a configuration of the projection-type display apparatus.

FIG. 2 is a block diagram illustrating an electrical configuration of the projection-type display apparatus 1. As illustrated in the drawing, the projection-type display apparatus 1 includes a display control circuit 20, the above-described liquid crystal panels 100R, 100G, and 100B, and the optical path shifting element 230.

Video data Vid-in is supplied from a higher-level device such as a host device (not illustrated) in synchronization with a synchronization signal Sync. The video data Vid-in designates a gray scale level of a pixel in an image to be displayed for each of RGB, for example, by 8 bits.

Note that the pixel in the image designated by the video data Vid-in is referred to as a video pixel, data that designates the gray scale level of the video pixel is referred to as pixel data, and the pixel in the composite image by the liquid crystal panels 100R, 100G, and 100B is referred to as a panel pixel. In the embodiment, the panel pixels are conveniently divided into active panel pixels and electrical parting panel pixels. As will be described in detail later, the electrical parting panel pixel has a transmittance corresponding to pixel data in a period as a part, and has a lowest transmittance in other periods. However, some of the active panel pixels may also have transmittances corresponding to pixel data or may have the lowest transmittance.

Further, a position of the panel pixel shifted by the optical path shifting element 230 and projected onto the screen Scr is referred to as a projection position.

In the composite image of the liquid crystal panels 100R, 100G, and 100B, the panel pixels are arrayed in a matrix in vertical and lateral directions. In the embodiment, an array of video pixels whose gray scale levels are designated by the video data Vid-in is, for example, about twice as large as the array of the panel pixels combined by the liquid crystal panels 100R, 100G, or 100B, in both the vertical direction and the lateral direction.

In the embodiment, a color image projected onto the screen Scr is expressed by combining the transmitted images of the liquid crystal panels 100R, 100G, and 100B. Thus, the pixel, which is a minimum unit of the color image, can be divided into a red sub-pixel by the liquid crystal panel 100R, a green sub-pixel by the liquid crystal panel 100G, and a blue sub-pixel by the liquid crystal panel 100B. However, when there is no need to specify the colors of the sub-pixels in the liquid crystal panels 100R, 100G, and 100B, or, for example, when handling only brightness as a problem, the sub-pixels do not need to be referred to as sub-pixels. Therefore, in the description herein, the panel pixel is also used as a display unit of the liquid crystal panels 100R, 100G, and 100B.

The synchronization signal Sync includes a vertical synchronization signal that instructs a start of vertical scanning of the video data Vid-in, a horizontal synchronization signal that instructs a start of horizontal scanning, and a clock signal that indicates a timing for one video pixel in the video data Vid-in.

The display control circuit 20 includes a processing circuit 22, and conversion circuits 23R, 23G, and 23B.

The processing circuit 22 accumulates the video data Vid-in supplied from the higher-level device for one or two or more frame periods, then reads the pixel data of the video pixel corresponding to the projection position by the optical path shifting element 230, and outputs the pixel data for each of RGB components. Note that the processing circuit 22 may output black data for minimizing the transmittance to the active panel pixels and the electrical parting panel pixels according to the projection position.

Of the pixel data or the black data output from the processing circuit 22, an R component is referred to as Vad_R, a G component is referred to as Vad_G, and a B component is referred to as Vad_B.

In the projection-type display apparatus 1, the projection position changes for each unit period obtained by dividing one frame period into four, thus eight of the projection positions can be set in eight unit periods in two consecutive frame periods. However, in the embodiment, the number of projection positions in the eight unit periods is set to be seven, as will be described below.

Note that the unit period is a period for causing a user to visually recognize an image, achieved by reducing a resolution of an image for one frame period designated by the video data Vid-in to one fourth of an original resolution, as the composite image by the liquid crystal panels 100R, 100G, and 100B.

The processing circuit 22 controls the projection position by the optical path shifting element 230 in each unit period. More specifically, with respect to the optical path shifting element 230, the processing circuit 22 controls a shift in a direction along the X-axis using a control signal P_x, and controls a shift in a direction along the Y-axis using a control signal P_y.

Note that the projection position for each unit period, and which of the video pixels, designated by the video data Vid-in in correspondence to each of the projection positions, is expressed by the panel pixel will be described later in more detail.

Further, the processing circuit 22 also generates a control signal Ctr for controlling the liquid crystal panels 100R, 100G, and 100B once every unit period.

The conversion circuit 23R converts data Vad_R as the R component into a pixel signal of an analog voltage, and supplies the pixel signal as a data signal Vid R to the liquid crystal panel 100R. The conversion circuit 23G converts data Vad_G as the G component into a pixel signal of an analog voltage, and supplies the pixel signal as a data signal Vid_G to the liquid crystal panel 100G. The conversion circuit 23B converts data Vad_B as the B component into a pixel signal of an analog voltage, and supplies the pixel signal as a data signal Vid_B to the liquid crystal panel 100B.

Next, the liquid crystal panels 100R, 100G, and 100B will be described. The liquid crystal panels 100R, 100G, and 100B only differ in the color of incident light, that is, in wavelength of the incident light, and otherwise have the same structure. Thus, the liquid crystal panels 100R, 100G, and 100B will be generally described below using a reference sign 100 without specifying the color.

Figure 3:
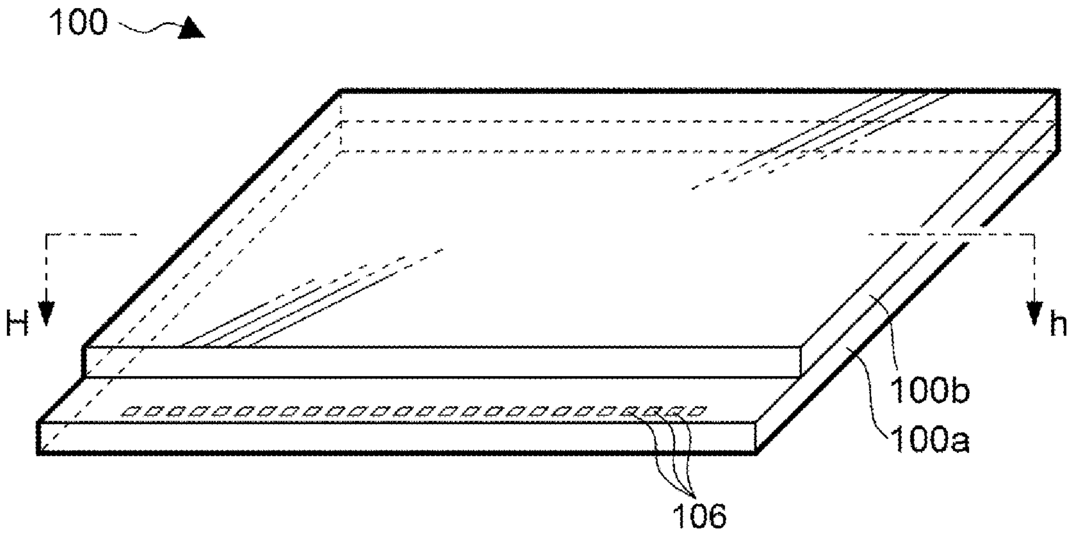
FIG. 3 is a perspective view illustrating a configuration of a liquid crystal panel in the projection-type display apparatus.
Figure 4:
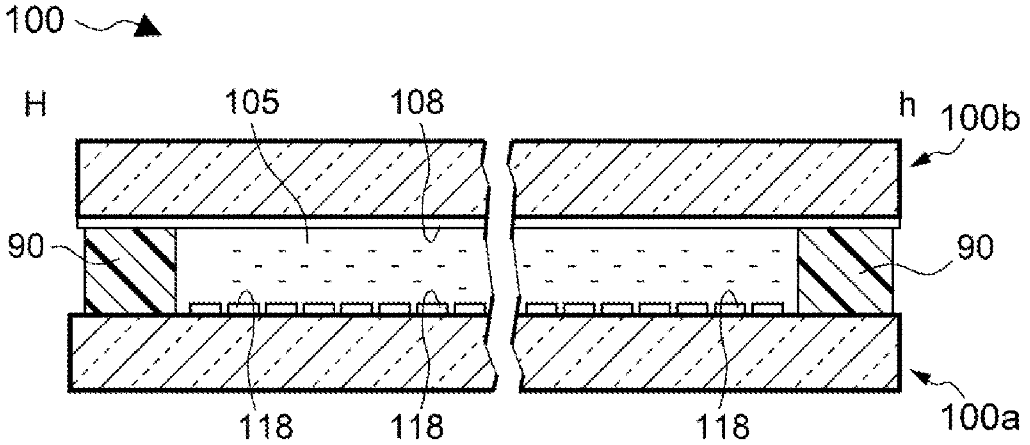
FIG. 4 is a cross-sectional view illustrating a structure of the liquid crystal panel.

FIG. 3 is a diagram illustrating main portions of the liquid crystal panel 100, and FIG. 4 is a cross-sectional view taken along a line H-h in FIG. 3.

As illustrated in these drawings, in the liquid crystal panel 100, an element substrate 100*a* at which pixel electrodes 118 are provided and a counter substrate 100*b* at which a common electrode 108 is provided are bonded to each other by a seal material 90, so that electrode-formed surfaces thereof face each other with a constant gap therebetween, and liquid crystal 105 is sealed in the gap.

As the element substrate 100*a* and the counter substrate 100*b*, transmissive substrates such as glass or quartz substrates are used. As illustrated in FIG. 3, one side of the element substrate 100*a* protrudes from the counter substrate 100*b*. In this protruding region, a plurality of terminals 106 are provided along the lateral direction in the drawing. One end of a flexible printed circuit (FPC) substrate (not illustrated) is coupled to the plurality of terminals 106. Note that another end of the FPC substrate is coupled to the display control circuit 20, and the above-described various signals are supplied thereto.

On the surface of the element substrate 100*a* facing the counter substrate 100*b*, the pixel electrodes 118 are formed by patterning a transparent conductive layer such as indium tin oxide (ITO), for example.

Further, various elements other than the electrodes are provided at the facing surface of the element substrate 100*a* and the facing surface of the counter substrate 100*b*, but are not illustrated in the drawings.

Figure 5:
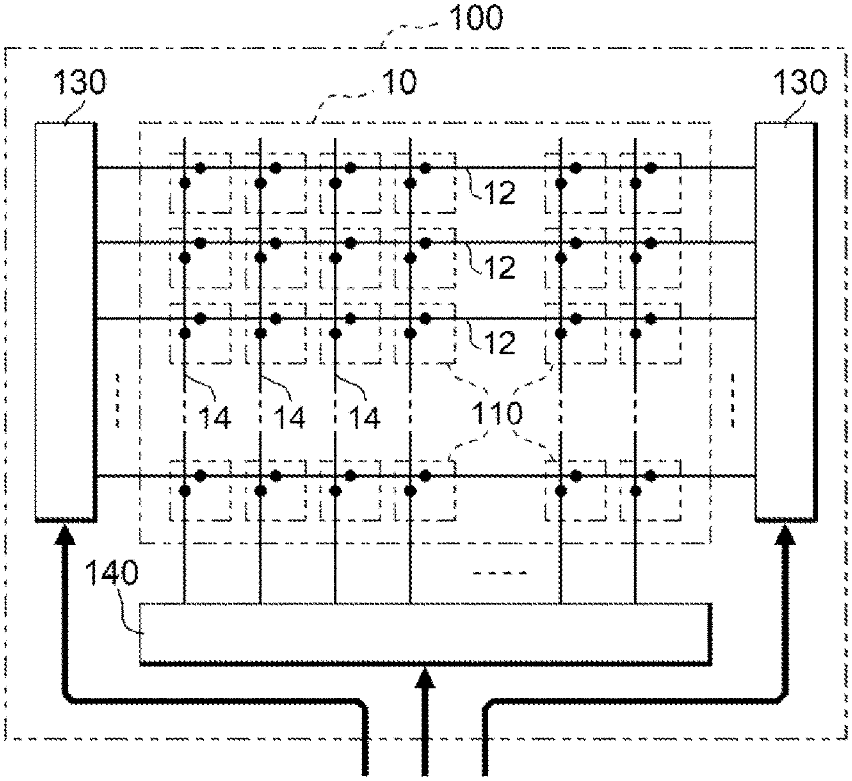
FIG. 5 is a block diagram illustrating an electrical configuration of the liquid crystal panel.

FIG. 5 is a block diagram illustrating an electrical configuration of the liquid crystal panel 100. In the liquid crystal panel 100, scanning line drive circuits 130 and a data line drive circuit 140 are provided at a periphery of a display region 10.

In the display region 10 of the liquid crystal panel 100, pixel circuits 110 are arrayed in a matrix. More specifically, in the display region 10, a plurality of scanning lines 12 are provided extending in the lateral direction in the drawing, and a plurality of data lines 14 are provided extending in the vertical direction, while the data lines 14 are electrically insulated from the scanning lines 12. The pixel circuits 110 are provided in a matrix corresponding to intersections between the plurality of scanning lines 12 and the plurality of data lines 14.

When the number of the scanning lines 12 is (m+2) and the number of the data lines 14 is (n+2), the pixel circuits 110 are arrayed in a matrix of (m+2) rows and (n+2) columns. m and n are each an integer of 2 or greater. With respect to the scanning lines 12 and the pixel circuits 110, in order to distinguish the rows of the matrix from each other, the rows may be referred as first, second, third, m-th, (m+1)th, and (m+2)th rows from a top in the drawing. Similarly, with respect to the data lines 14 and the pixel circuits 110, in order to distinguish the columns of the matrix from each other, the columns may be referred as first, second, third, . . . , n-th, (n+1)th, and (n+2)th columns from a left in the drawing.

The scanning line drive circuit 130 selects the scanning lines 12 one by one, for example, in order of the first, second, third, . . . , m-th, (m+1)th, and (m+2)th rows under the control of the display control circuit 200, and sets a scanning signal to the selected scanning line 12 to an H level. Note that the scanning line drive circuit 130 sets the scanning signals to the scanning lines 12 other than the selected scanning line 12, to an L level.

The data line drive circuit 140 latches one row of the data signals supplied from the circuit of the corresponding color, that is, from one of processing circuits 220R, 220G, or 220B, and in a period in which the scanning signal to the scanning line 12 is set to the H level, outputs the data signal to the pixel circuit 110 located at that scanning line 12 via the data line 14.

Figure 6:
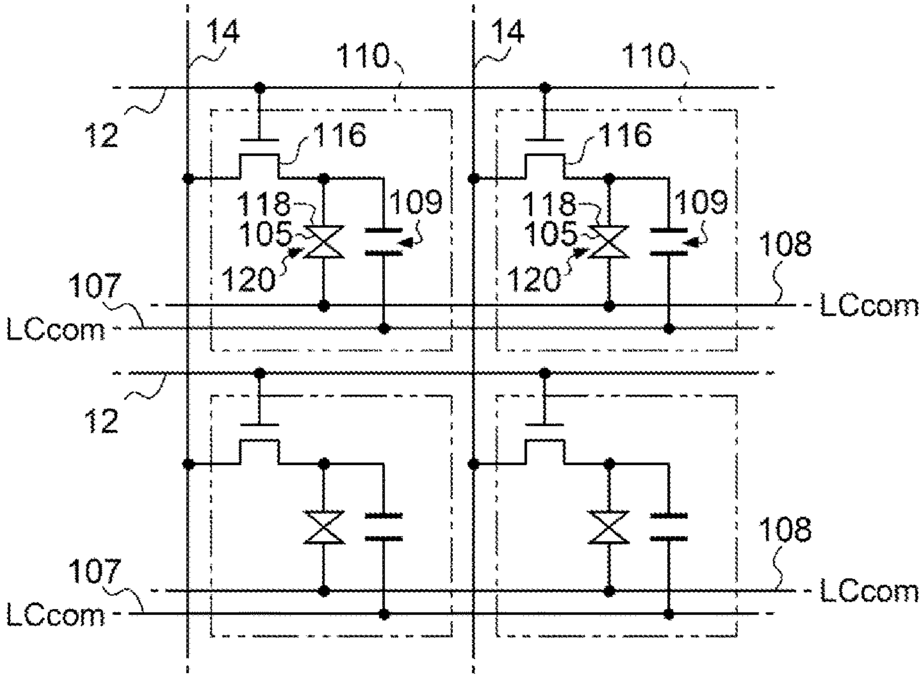
FIG. 6 is a diagram illustrating a configuration of a pixel circuit in the liquid crystal panel.

FIG. 6 is a diagram illustrating an equivalent circuit of a total of four of the pixel circuits 110, in two rows and two columns, corresponding to intersections between two of the adjacent scanning lines 12 and two of the adjacent data lines 14.

As illustrated in the drawing, the pixel circuit 110 includes a transistor 116 and a liquid crystal element 120. The transistor 116 is, for example, an n-channel thin film transistor. In the pixel circuit 110, a gate node of the transistor 116 is coupled to the scanning line 12, a source node thereof is coupled to the data line 14, and a drain node thereof is coupled to the pixel electrode 118 having a square shape in plan view.

The common electrode 108 is provided commonly for all of the pixels, so as to face the pixel electrodes 118. A voltage LCcom is applied to the common electrode 108. The liquid crystal 105 is interposed between the pixel electrodes 118 and the common electrode 108, as described above. Thus, the liquid crystal element 120, in which the liquid crystal 105 is interposed between the pixel electrodes 118 and the common electrode 108, is formed for each of the pixel circuits 110.

Further, a storage capacitor 109 is provided in parallel with the liquid crystal element 120. One end of the storage capacitor 109 is coupled to the pixel electrode 118, while another end thereof is coupled to a capacitor line 107. A temporally constant voltage, for example, the same voltage LCcom as the voltage applied to the common electrode 108, is applied to the capacitor line 107. Since the pixel circuits 110 are arrayed in the matrix in the lateral direction, which is the extending direction of the scanning lines 12, and in the vertical direction, which is the extending direction of the data lines 14, the pixel electrodes 118 included in the pixel circuits 110 are also arrayed in the lateral direction and the vertical direction.

In the scanning line 12 in which the scanning signal is set to the H level, the transistor 116 of the pixel circuit 110 provided corresponding to that scanning line 12 is turned on. Since the data line 14 and the pixel electrode 118 are electrically coupled to each other as a result of the transistor 116 being turned on, the data signal supplied to the data line 14 reaches the pixel electrode 118 through the transistor 116 that has been turned on. When the scanning line 12 is set to the L level, the transistor 116 is turned off, but the voltage of the data signal, which has reached the pixel electrode 118, is retained by capacitive properties of the liquid crystal element 120 and the storage capacitor 109.

As is well known, in the liquid crystal element 120, liquid crystal molecular alignment changes in accordance with an electric field generated by the pixel electrode 118 and the common electrode 108. Thus, the liquid crystal element 120 has a transmittance corresponding to an effective value of the applied voltage.

Note that a region functioning as the pixel in the liquid crystal element 120, that is, a region having the transmittance corresponding to the effective value of the voltage is a region in which the pixel electrode 118 and the common electrode 108 overlap each other when the element substrate 100*a* and the counter substrate 100*b* are viewed in plan view. Since the pixel electrode 118 has the square shape in plan view, the shape of the pixel of the liquid crystal panel 100 is also a square shape.

In addition, in the embodiment, for the liquid crystal 105, a vertical alignment (VA) method, and a normally black mode in which a transmittance is a lowest when an applied voltage to the liquid crystal element 120 is zero, and the transmittance increases as the applied voltage increases, are adopted.

In this manner, the liquid crystal element 120 functions as the panel pixel of the liquid crystal panel 100. Therefore, the array of the panel pixels is equal to the array of the pixel circuits 110. Note that, among the panel pixels, there is no difference in structure and electrical configuration between the active panel pixel and the electrical parting panel pixel.

Operation of supplying the data signal to the pixel electrode 118 of the liquid crystal element 120 is performed in an order of the first, second, third, . . . , m-th, (m+1)th, and (m+2) rows in one unit period. As a result, a voltage corresponding to the data signal is retained in each of the liquid crystal elements 120 of the pixel circuits 110 arrayed in the (m+2) rows and (n+2) columns, each of the liquid crystal element 120 comes to have a target transmittance, and the transmitted image of the corresponding color is generated by the liquid crystal elements 120 arrayed in the (m+2) rows and (n+2) columns.

In this way, the transmitted image is generated for each of RGB, and the color image obtained by combining RGB is projected onto the screen Scr.

The data Vad_R, Vad_G, and Vad_B output from the processing circuit 22 corresponding to one unit period are the pixel data of the video pixel corresponding to that unit period, or the black data having the lowest gray scale level. Thus, at least in that unit period, a color composite image corresponding to a projection position is projected at that projection position.

Figure 7:
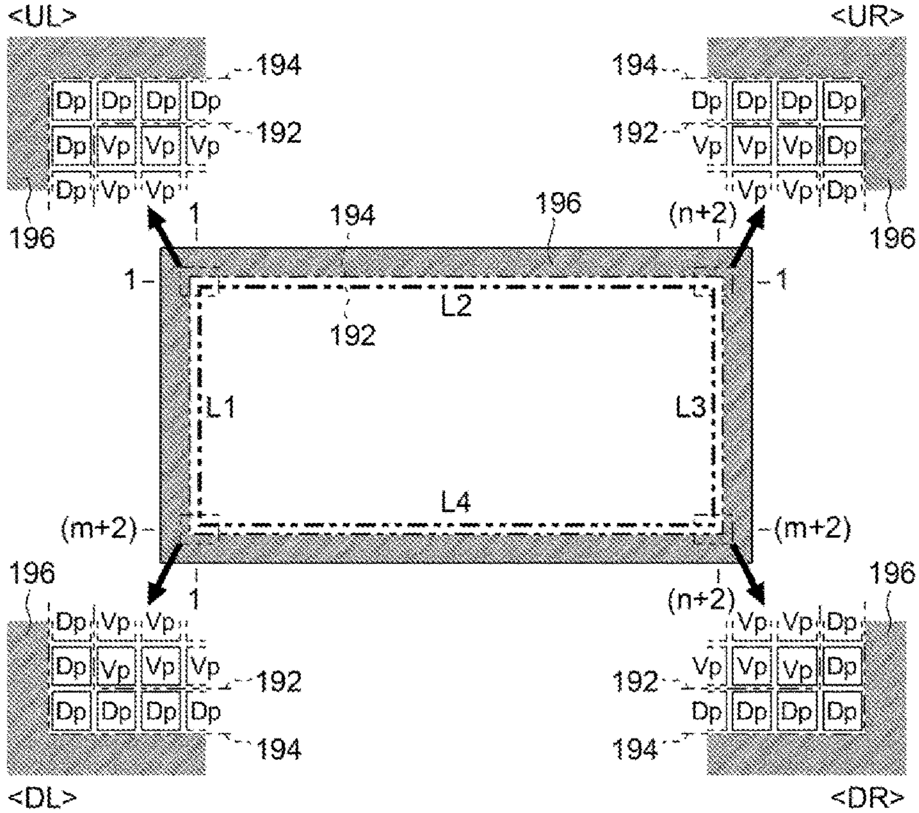
FIG. 7 is a plan view illustrating an array of panel pixels in the liquid crystal panel.

FIG. 7 is a plan view illustrating the array of the panel pixels, and particularly, is an enlarged view illustrating an upper left end portion UL, an upper right end portion UR, a lower left end portion DL, and a lower right end portion DR of the array of the panel pixels.

As described above, the pixel circuits 110, that is, the panel pixels are arrayed in the matrix of (m+2) rows and (n+2) columns. In the array of the panel pixels, in the first embodiment, active panel pixels Vp are arrayed in a matrix of m rows and n columns except for the first row and the (m+2)th row, and the first column and the (n+2)th column.

Electrical parting panel pixels Dp are arrayed in a frame shape surrounding a region where the active panel pixels Vp are arrayed in the m rows and n columns. In other words, the electrical parting panel pixels Dp are arrayed in one column on a left side L1, one row on an upper side L2, one column on a right side L3, and one row on a lower side L4 in the array of the (m+2) rows and (n+2) columns in the panel pixels.

In FIG. 7, a boundary 192 is a virtual line indicating a boundary between the active panel pixels Vp and the electrical parting panel pixels Dp, and an outer edge 194 is a virtual line indicating an outer edge of the region where the panel pixels are arrayed. On an outside of the outer edge 194 with respect to the region where the panel pixels are arrayed, a light shielding portion 196 that functions as a parting (frame) is provided as indicated by hatching in the drawing.

Note that there is no structural difference between the active panel pixel Vp and the electrical parting panel pixel Dp, and the different names are used for conveniently distinguishing the pixels.

As described above, the video pixels in the video data Vid-in are arrayed in 2m rows and 2n columns, which are approximately twice as large in both the vertical direction and the lateral direction compared with the (m+2) rows and (n+2) columns in which the panel pixels are arrayed in the liquid crystal panels 100R, 100G, and 100B. In other words, the array of the panel pixels is approximately half the size of the array of the video pixels in both the vertical direction and the lateral direction.

Thus, in the embodiment, in one frame period, one panel pixel is shifted at a total of four positions, namely, two positions in the vertical direction times two positions in the lateral direction, so that the one panel pixel is visually recognized as if it is indicating four of the video pixels designated by the video data Vid-in.

However, in a configuration in which the video pixel is expressed by simply shifting one panel pixel to the four positions in one frame period, the display quality may deteriorate. Thus, in the embodiment, the projection position of one panel pixel is shifted in each of eight unit periods over two frame periods to express a video pixel, and further, a direction in which the projection position is shifted for each of the unit periods in an odd-numbered frame period and a direction in which the projection position is shifted for each of the unit periods in an even-numbered frame period are set to be opposite to each other. In other words, an array of four video pixels expressed in the odd-numbered frame period and an array of four video pixels expressed in the even-numbered frame period are in a point symmetry relationship with respect to one common video pixel.

Figure 8:
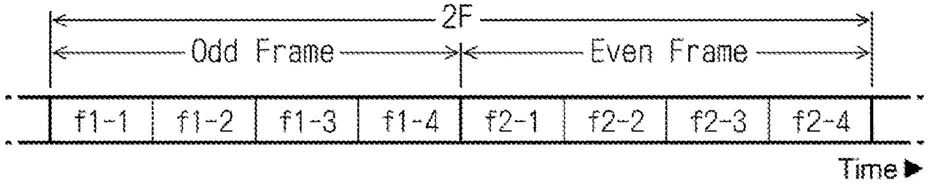
FIG. 8 is a diagram illustrating frame periods and unit periods in the projection-type display apparatus.

FIG. 8 is a diagram for describing a relationship between the frames and the unit periods in the embodiment. As illustrated in the drawing, in the embodiment, a two-frame (2F) period is divided into the odd-numbered frame (odd frame) period that temporally precedes and the even-numbered frame (even frame) period that temporally succeeds.

The odd-numbered frame period is divided into four unit periods. In order to distinguish the four unit periods in the odd-numbered frame period from each other, reference signs f1-1, f1-2, f1-3, and f1-4 are assigned in a chronological order for convenience. Similarly, the even-numbered frame period is divided into four unit periods. In order to distinguish the four unit periods in the even-numbered frame period, reference signs f2-1, f2-2, f2-3, and f2-4 are assigned in the chronological order for convenience.

Note that the number of unit periods included in each of the odd-numbered frame period and the even-numbered frame period, which is "4" in this case, is an example of an integer k of 2 or greater. Further, the odd-numbered frame period is an example of a first frame period, and the even-numbered frame period is an example of a second frame period. The unit periods f1-1 and f2-1 are examples of a first unit period, the unit periods f1-2 and f2-2 are examples of a second unit period, the unit periods f1-3 and f2-3 are examples of a third unit period, and the unit periods f1-4 and f2-4 are examples of a fourth unit period.

One frame period is a period in which one frame of the image designated by the video data Vid-in from the higher-level device is supplied. When the frequency of the vertical synchronization signal included in the synchronization signal Sync is 60 Hz, one frame period is a period of 16.7 milliseconds. In this case, the length of each of the unit periods is ¼ of the length of the one frame period, which is 4.17 milliseconds.

Figure 9:
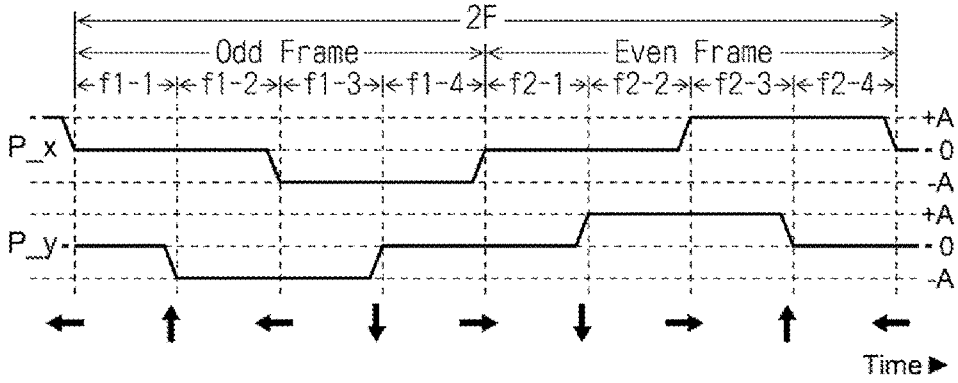
FIG. 9 is a diagram illustrating operation of an optical path shifting element.

FIG. 9 is a diagram illustrating an example of waveforms of the control signals P_x and P_y supplied to the optical path shifting element 230.

The optical path shifting element 230 shifts the image projected onto the screen Scr in the X-axis and the Y-axis with respect to the projection surface. For convenience, an amount of the shift will be described in terms of the size of the pixel projected onto the screen Scr, that is, the size of the panel pixel.

Each of the control signals P_x and P_y has a level of one of three values of +A, 0, and −A, except for during a rear end period of each of the unit periods f1-1 to f1-4 and f2-1 to f2-4. The levels of the control signals P_x and P_y change in the rear end period. The rear end period is a period corresponding to a vertical scanning flyback period.

Note that the level of the control signal P_x or P_y may be constant over two consecutive unit periods.

For convenience of description, the projection position in the period, other than the rear end period, of the unit period f1-1 in the odd-numbered frame period, that is, the projection position in the period in which the levels of the control signals P_x and P_y are 0 is set as a reference position.

When the level of the control signal P_x is +A, the optical path shifting element 230 shifts the projection position from the reference position by half of the panel pixel in the X direction, and when the level of the control signal P_x is −A, the optical path shifting element 230 shifts the projection position from the reference position by half of the panel pixel in the direction opposite to the X direction.

When the level of the control signal P_y is +A, the optical path shifting element 230 shifts the projection position from the reference position by half of the panel pixel in the Y direction, and when the level of the control signal P_y is −A, the optical path shifting element 230 shifts the projection position from the reference position by half of the panel pixel in the direction opposite to the Y direction.

Thus, for example, when the level of the control signal P_x is +A and the level of the control signal P_y is +A, the optical path shifting element 230 shifts the projection position from the reference position by half of the panel pixel in each of the X direction and the Y direction.

Note that an arrow illustrated in the rear end period of each of the unit periods in FIG. 9 indicates in which direction the projection position is shifted when the levels of the control signals P_x and P_y are changed or maintained in that rear end period.

Further, the shift of the projection position by the optical path shifting element 230 may not be performed according to the levels of the control signals P_x and P_y, and may be accompanied by a time delay.

Next, a description will be made as to which video pixel among the video pixels of the video data Vid-in is expressed by the panel pixel of the liquid crystal panel 100 in the odd-numbered frame period and the even-numbered frame period. Note that a panel pixel expressing a video pixel means that a data signal corresponding to the panel pixel causes the panel pixel to have luminance (brightness) corresponding to a gray scale level designated by the video data.

Figure 10:
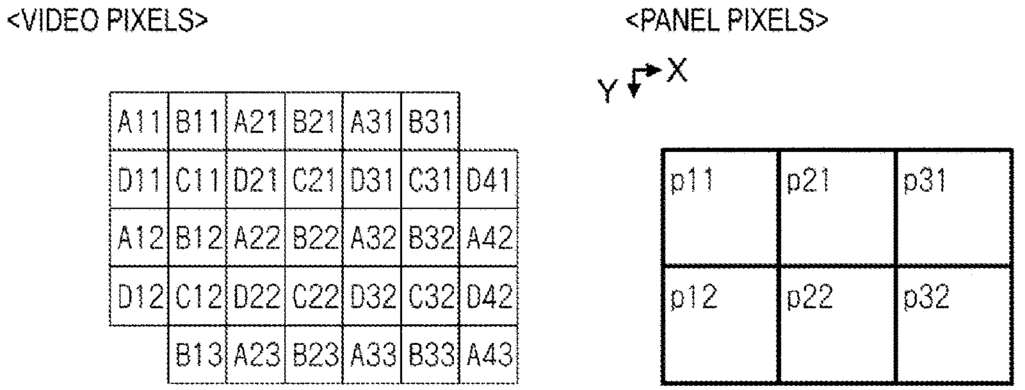

A left field in FIG. 10 is a diagram in which only a part of the video image designated by the video data Vid-in is extracted, specifically, the video pixels located at a left upper end in the drawing are extracted, in order to describe the array of the video pixels. Further, a right field in the drawing is a diagram illustrating the array of the panel pixels corresponding to the array of the video pixels in the left field.

Note that, in the left field of FIG. 10, for convenience, A11, B11, A21, B21, A31, and B31 are respectively assigned to the video pixels of the first row as reference signs, in order to distinguish the video pixels of the video data Vid-in. Similarly, the second to fifth rows are also denoted by reference signs as illustrated in the drawing.

In the right field of FIG. 10, in order to distinguish the panel pixels, for convenience, p11, p21, and p31 are assigned, as reference signs, to the panel pixels of the first row, and p12, p22, and p32 are assigned to the panel pixels of the second row.

Figure 11:
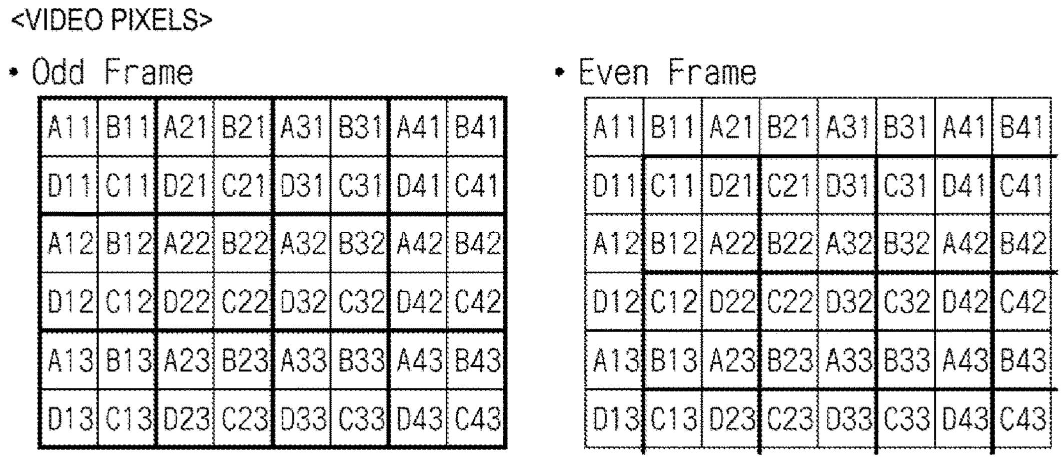
FIG. 11 is a diagram illustrating a correspondence relationship between the video pixels and the panel pixels in each of the frame periods in the first embodiment.

FIG. 11 is a diagram illustrating the video pixels expressed by the panel pixels in the odd-numbered frame period and the even-numbered frame period. Note that, in the drawing, a black thick frame, which surrounds a total of four video pixels in 2 rows times 2 columns, indicates a group of the video pixels expressed by one panel pixel. The four video pixels expressed by one panel pixel are different between the odd-numbered frame period and the even-numbered frame period. More specifically, in the first embodiment, the 2 times 2 video pixels expressed by one panel pixel in the even-numbered frame period are shifted by one video pixel in the right direction and one video pixel in the downward direction, from the 2 times 2 video pixels expressed by the panel pixel in the odd-numbered frame period.

Figure 12:
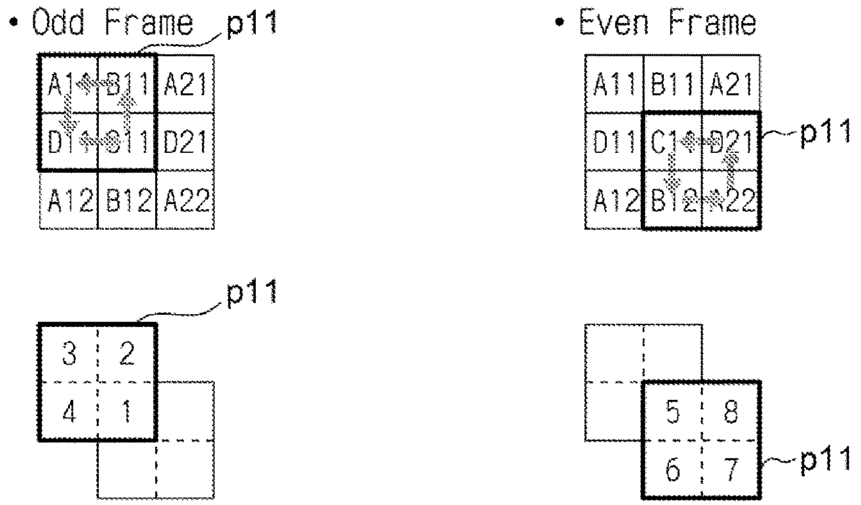
FIG. 12 is a diagram illustrating an order of the video pixels supplied to the panel pixel and positions of the video pixels corresponding to the panel pixel in the first embodiment.

An upper field of FIG. 12 is a diagram, while focusing on the panel pixel p11 in particular, illustrating an order in which the video pixels are expressed by the panel pixel p11 in each of the odd-numbered frame period and the even-numbered frame period. As illustrated in the drawing, the panel pixel p11 sequentially expresses the video pixels C11, B11, A11, and D11 in the unit periods f1-1 to f1-4 of the odd-numbered frame period, and sequentially expresses the video pixels C11, B12, A22, and D21 in the unit periods f2-1 to f2-4 of the even-numbered frame period. In other words, with respect to the panel pixel p11, the order in which the video pixels are expressed in the odd-numbered frame period and the order in which the video pixels are expressed in the even-numbered frame period have a point symmetry relationship with respect to the video pixel C11.

A lower field of FIG. 12 is a diagram illustrating positions and an order of the video pixels C11, B11, A11, and D11 expressed by the panel pixel p11 in the unit periods f1-1 to f1-4 of the odd-numbered frame period, and 1 to 4 are assigned as reference signs. For example, a position of 3 in the panel pixel p11 indicates that the panel pixel p11 expresses the video pixel A11 at the position of 3 in the upper field of FIG. 12 in the third unit period f1-3 when viewed through the two-frame period. Note that the reference signs are illustrated without parentheses in the drawings and with parentheses in the description. Similarly, in the unit periods f2-1 to f2-4 of the even-numbered frame period, the positions of the video pixels C11, B12, A22, and D21 expressed by the panel pixel p11 and the order 5 to 8 are illustrated.

Figure 13:
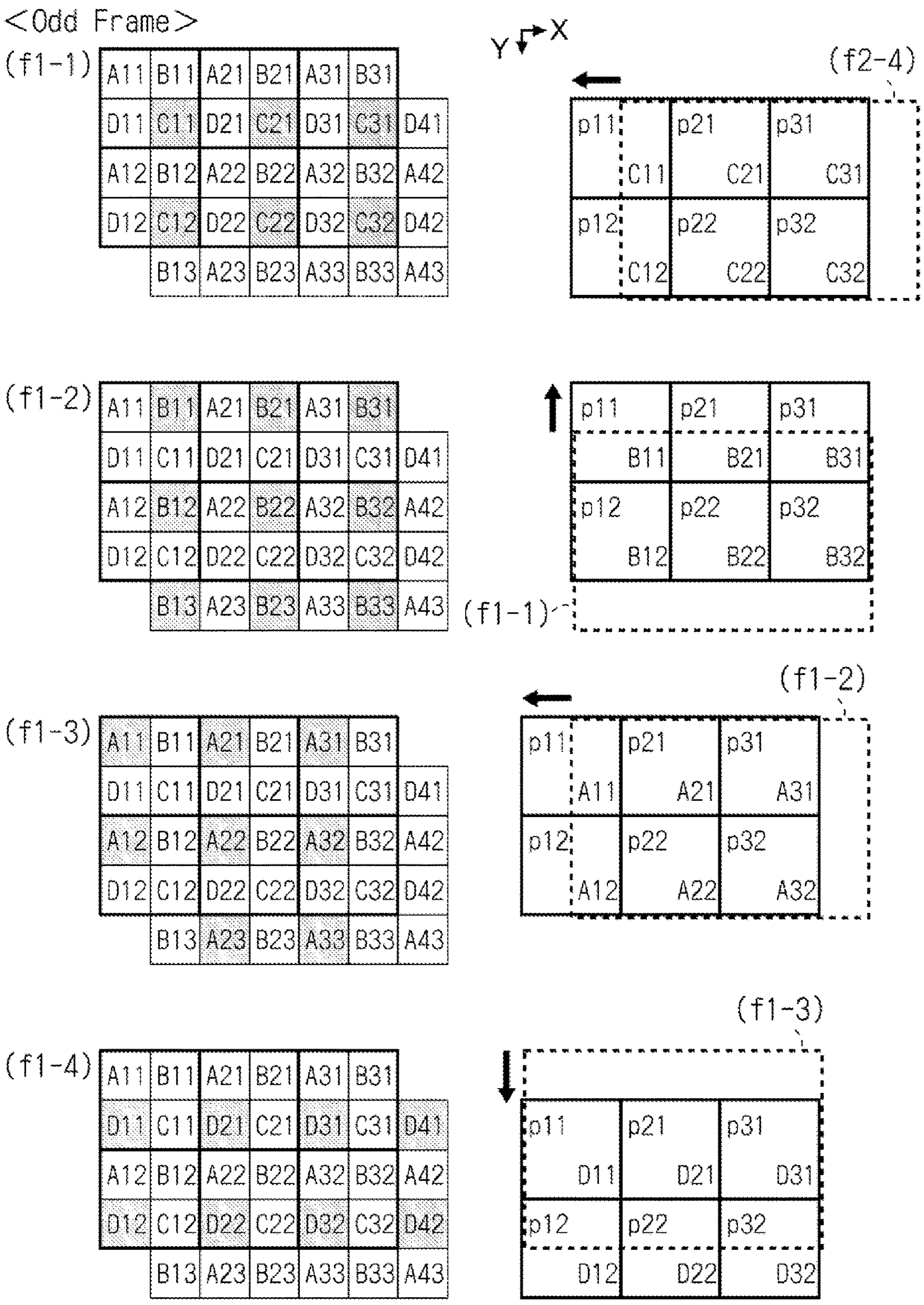
FIG. 13 is a diagram illustrating a relationship among the video pixels, the panel pixels, and projection positions in an odd-numbered frame period in the first embodiment.
Figure 14:
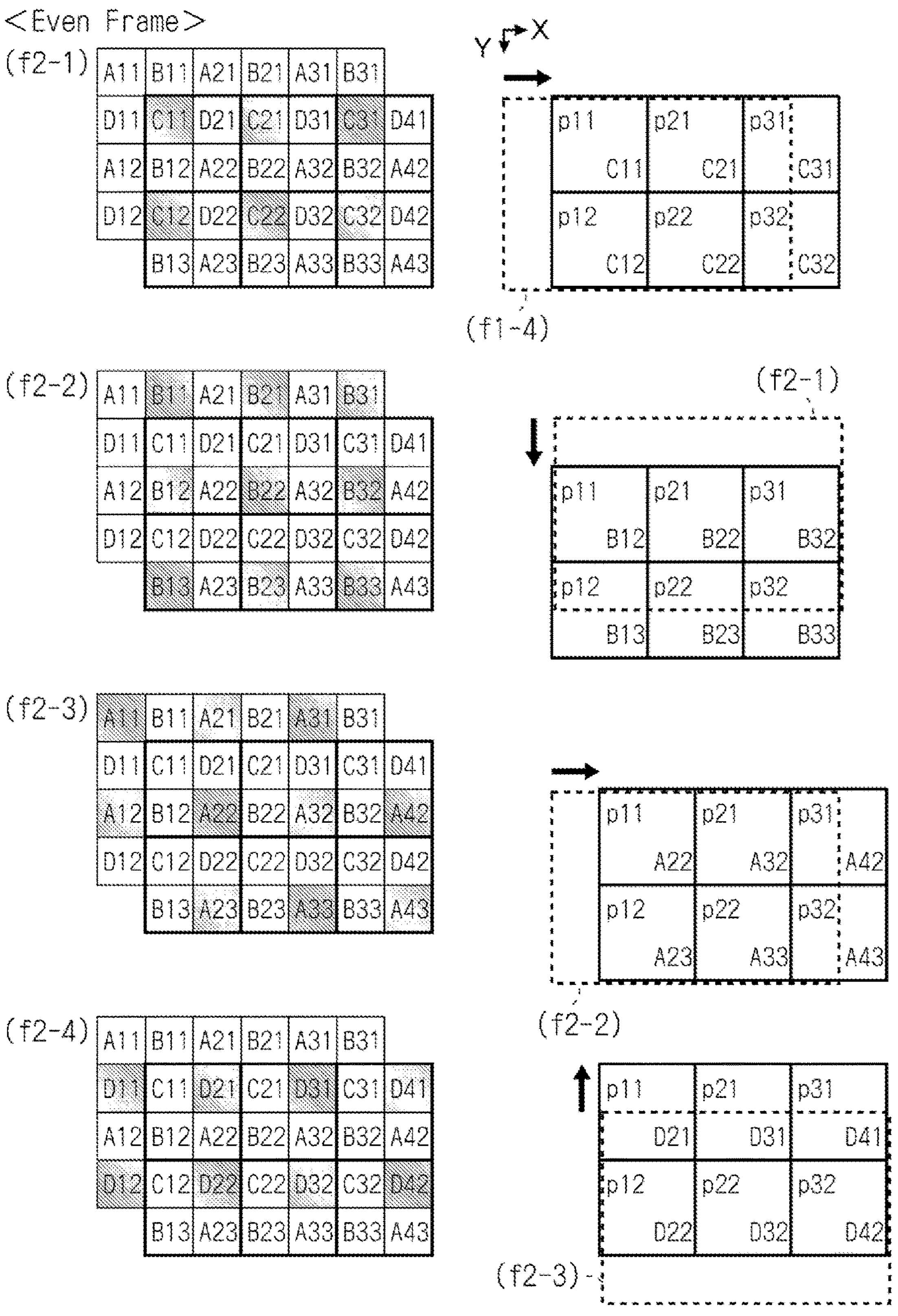
FIG. 14 is a diagram illustrating a relationship among the video pixels, the panel pixels, and the projection positions in an even-numbered frame period in the first embodiment.

FIG. 13 and FIG. 14 are diagrams illustrating which video pixel is expressed at which projection position by the panel pixel in the projection-type display apparatus 1 according to the embodiment. More specifically, FIG. 13 is a diagram illustrating at which projection positions the video pixels in the left field of FIG. 10 are expressed by six panel pixels in FIG. 10 in the unit periods f1-1 to f1-4 of the odd-numbered frame period. Further, FIG. 14 is a diagram illustrating at which projection positions the video pixels are expressed by the six panel pixels in the unit periods f2-1 to f2-4 of the even-numbered frame period.

For convenience, the projection position in the unit period f1-1 of the odd-numbered frame period is set as the reference position, as described above. As illustrated in FIG. 13, in the unit period f1-1 of the odd-numbered frame period, the panel pixels p11, p21, p31, p12, p22, and p32 express the hatched video pixels C11, C21, C31, C12, C22, and C32, respectively. That is, among the four video pixels expressed by one panel pixel in the odd-numbered frame period, the video pixel at the position (1) is expressed in the unit period f1-1.

In the rear end period (vertical flyback period) of the unit period f1-1, the optical path shifting element 230 shifts the projection position from the reference position in the unit period f1-1 indicated by a dashed line, in the upward direction in the drawing (direction opposite to the Y direction) by an amount corresponding to 0.5 panel pixels. In the next unit period f1-2, the panel pixels p11, p21, p31, p12, p22, and p32 express the hatched video pixels B11, B21, B31, B12, B22, B32, respectively. That is, among the four video pixels expressed by one panel pixel in the odd-numbered frame period, the video pixel at the position (2) is expressed in the unit period f1-2.

In the rear end period of the unit period f1-2, the optical path shifting element 230 shifts the projection position from the projection position in the unit period f1-2 indicated by a dashed line, by an amount corresponding to 0.5 panel pixels in the leftward direction in the drawing (the direction opposite to the X direction). In the next unit period f1-3, the panel pixels p11, p21, p31, p12, p22, and p32 express the hatched video pixels A11, A21, A31, A12, A22, and A32, respectively. That is, among the four video pixels expressed by one panel pixel in the odd-numbered frame period, the video pixel at the position (3) is expressed in the unit period f1-3.

In the rear end period of the unit period f1-3, the optical path shifting element 230 shifts the projection position from the projection position in the unit period f1-3 indicated by a dashed line, by an amount corresponding to 0.5 panel pixels in the downward direction in the drawing (Y direction). In the next unit period f1-4, the panel pixels p11, p21, p31, p12, p22, and p32 express the hatched video pixels D11, D21, D31, D12, D22, and D32, respectively. That is, among the four video pixels expressed by one panel pixel in the odd-numbered frame period, the video pixel at the position (4) is expressed in the unit period f1-4.

In the rear end period of the unit period f1-4, the optical path shifting element 230 shifts the projection position from the projection position in the unit period f1-4 indicated by a dashed line, by an amount corresponding to 0.5 panel pixels in the rightward direction in the drawing (the X direction) so as to return to the reference position. In the first unit period f2-1 in the even-numbered frame period, the panel pixels p11, p21, p31, p12, p22, and p32 express the hatched video pixels C11, C21, C31, C12, C22, and C32, respectively. In other words, a video pixel expressed by one panel pixel in the unit period 1-1 is the same as the video pixel expressed by the panel pixel in the unit period 2-1. Further, among the four video pixels expressed by one panel pixel in the even-numbered frame period, the video pixel at the position (5) is expressed in the unit period f2-1.

In the rear end period of the unit period f2-1, the optical path shifting element 230 shifts the projection position from the reference position in the unit period f2-1 indicated by a dashed line, in the downward direction in the drawing (the Y direction) by an amount corresponding to 0.5 panel pixels. In the next unit period f2-2, the panel pixels p11, p21, p31, p12, p22, and p32 express the hatched video pixels B12, B22, B32, B13, B23, and B33, respectively.

Note that among the four video pixels expressed by one panel pixel in the even-numbered frame period, the video pixel at the position (6) is expressed in the unit period f2-2.

In the rear end period of the unit period f2-2, the optical path shifting element 230 shifts the projection position from the projection position in the unit period f2-2 indicated by a dashed line, by an amount corresponding to 0.5 panel pixels in the rightward direction in the drawing (the X direction). Further, in the unit period f2-3, the panel pixels p11, p21, p31, p12, p22, and p32 express the hatched video pixels A22, A32, A42, A23, A33, and A42, respectively. Note that among the four video pixels expressed by one panel pixel in the even-numbered frame period, the video pixel at the position (7) is expressed in the unit period f2-3.

In the rear end period of the unit period f2-3, the optical path shifting element 230 shifts the projection position from the projection position in the unit period f2-3 indicated by a dashed line, by an amount corresponding to 0.5 panel pixels in the upward direction in the drawing (the direction opposite to the Y direction). In the next unit period f2-4, the panel pixels p11, p21, p31, p12, p22, and p32 express the hatched video pixels D21, D31, D41, D22, D32, and D42, respectively. That is, among the four video pixels expressed by one panel pixel in the even-numbered frame period, the video pixel at the position (8) is expressed in the unit period f2-4.

In the rear end period of the unit period f2-4, the optical path shifting element 230 shifts the projection position from the projection position indicated by a dashed line, by an amount corresponding to 0.5 panel pixels in the leftward direction in the drawing (the direction opposite to the X direction) so as to return to the reference position.

Before describing the electrical parting panel pixel Dp among the panel pixels in the embodiment, a comparative example for the embodiment will be described.

Figure 24:
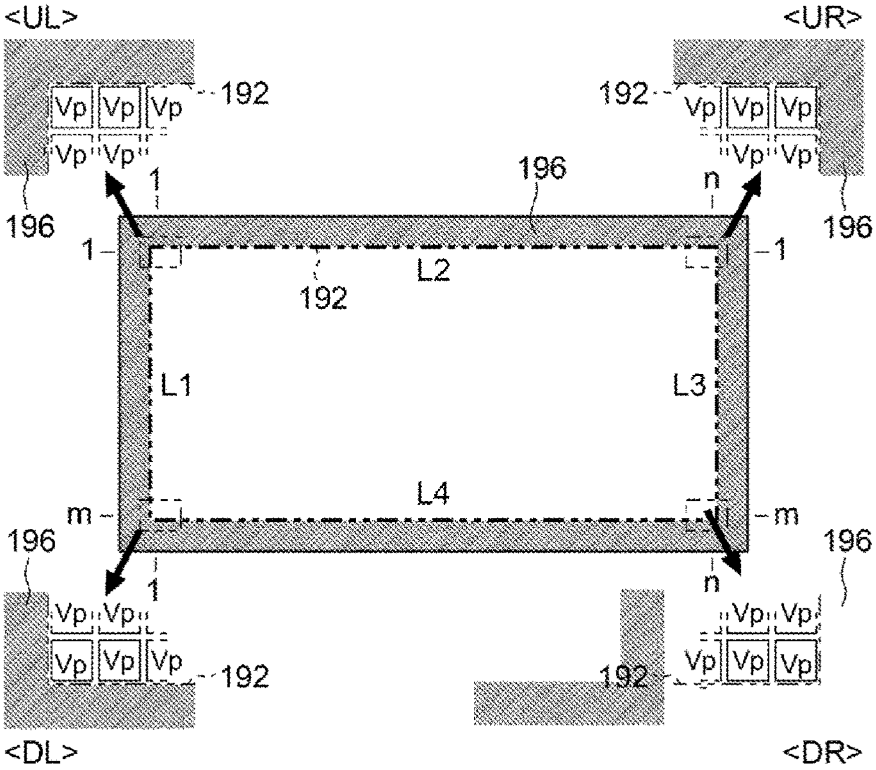
FIG. 24 is a plan view illustrating an array of panel pixels in a liquid crystal panel of a comparative example.

FIG. 24 is a plan view illustrating an array of the panel pixels, and particularly, is an enlarged view illustrating the upper left end portion UL, the upper right end portion UR, the lower left end portion DL, and the lower right end portion DR of the array of the panel pixels. As illustrated in the drawing, in the comparative example, the electrical parting panel pixels Dp do not exist, and only the active panel pixels Vp are arrayed in a matrix of m rows and n columns. Note that in the comparative example, the light shielding portion 196 is arranged outside an array region of the active panel pixels Vp in plan view.

Figure 25:
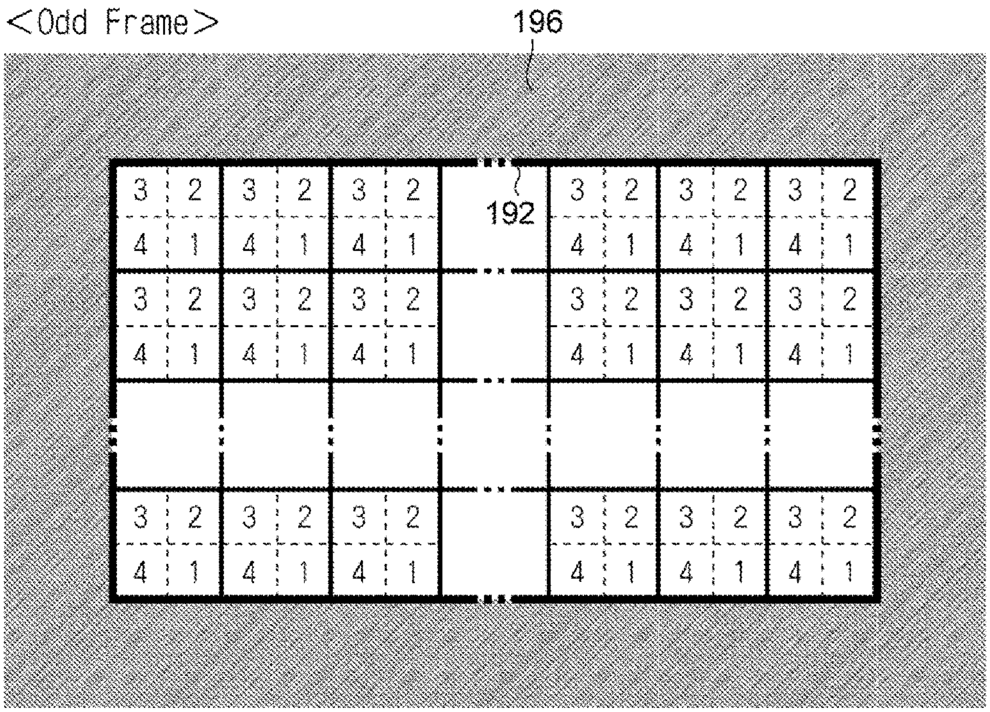
FIG. 25 is a diagram illustrating data signals supplied to the panel pixels in an odd-numbered frame period in the comparative example.

In the odd-numbered frame period, the video pixels and the panel pixels have a correspondence relationship as illustrated in a left field of FIG. 11. That is, in the odd-numbered frame period, one panel pixel expresses the four video pixels surrounded by the black thick line in the four unit periods 1-1 to 1-4. Therefore, as illustrated in FIG. 25, in the comparative example, all the video pixels arrayed in 2m rows and 2n columns in the periods of the odd-numbered frame are expressed by the panel pixels arrayed in m rows and n columns, so that no lack of display occurs when the video pixels are expressed.

Figure 26:
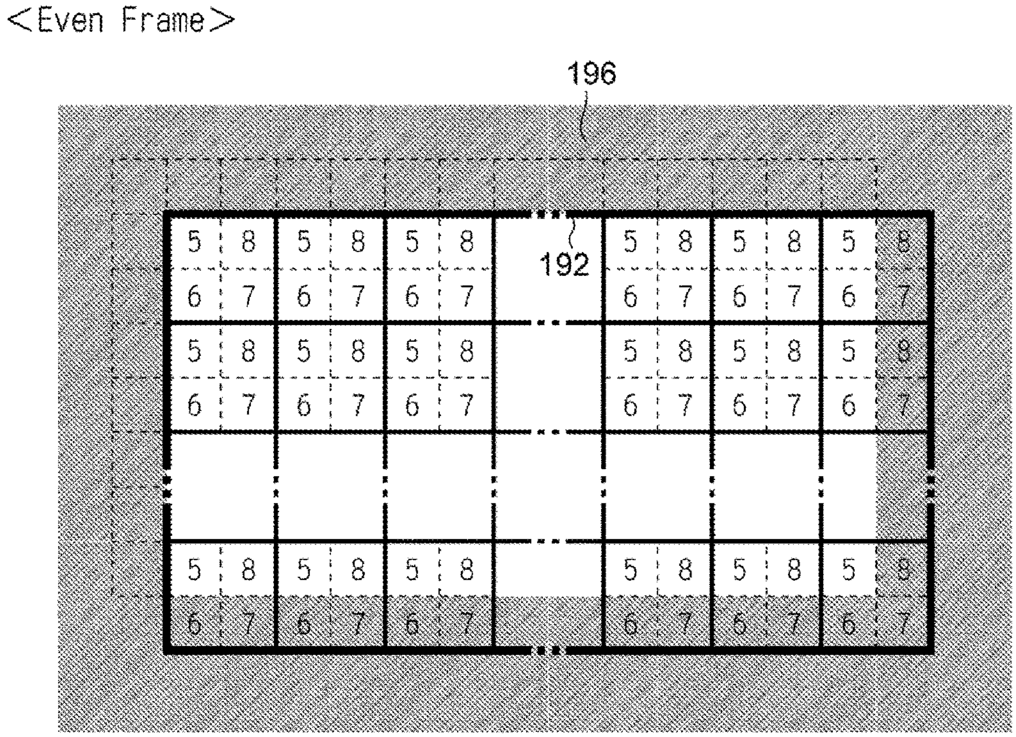
FIG. 26 is a diagram illustrating the data signal supplied to the panel pixels in an even-numbered frame period in the comparative example.

In the even-numbered frame period, the four video pixels expressed by one panel pixel are shifted in the downward direction by one video pixel, and shifted in the right direction by one video pixel with respect to the four video pixels in the odd-numbered frame period. In the comparative example, the light shielding portion 196 is arranged outside the array region of the active panel pixels Vp in plan view, and there is no panel pixel that can express the video pixel. Therefore, in the even-numbered frame period, in the array of the video pixels illustrated in a right field of FIG. 11, the video pixels in the upper end row and the left end column are not expressed. Therefore, as illustrated in FIG. 26, in the comparative example, since not all the video pixels arrayed in the 2m rows and 2n column are expressed by the panel pixels in the periods of the even-numbered frame, lack of display occurs.

Note that, of the active panel pixels Vp arrayed in the m rows and n columns in the comparative example, the active panel pixels Vp in one column on a right end have no video pixel to express at the positions (7) and (8). Similarly, the active panel pixels Vp in one row on a lower end have no video pixel to express at the positions (6) and (7).

In the embodiment, in order to prevent the lack of display as in the comparative example, a configuration is adopted in which the electrical parting panel pixels Dp are provided so as to surround the active panel pixels Vp, and the video pixels and the like are expressed as follows in the even-numbered frame period and the odd-numbered frame period.

Figure 15:
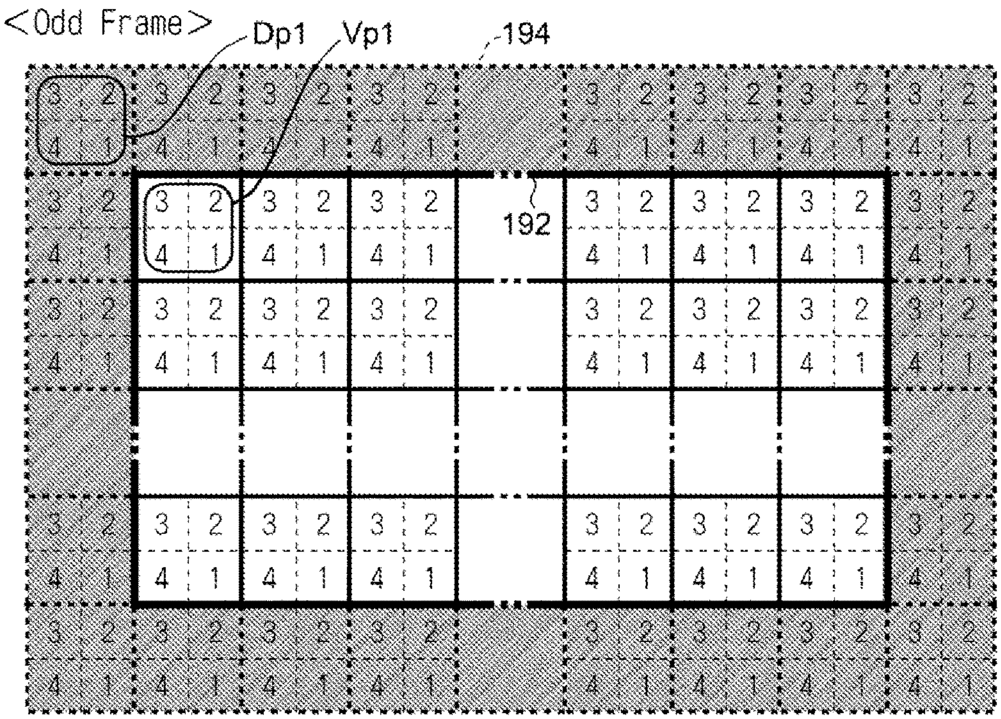
FIG. 15 is a diagram illustrating data signals supplied to panel pixels in the odd-numbered frame period in the first embodiment.
Figure 16:
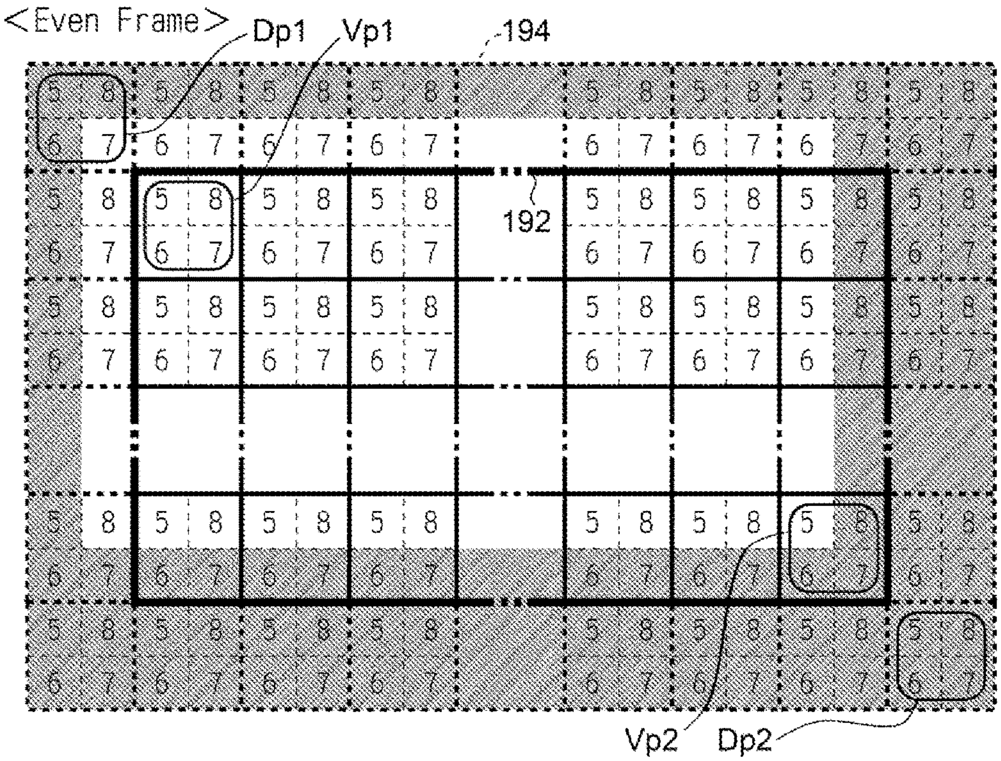
FIG. 16 is a diagram illustrating the data signals supplied to the panel pixels in the even-numbered frame period in the first embodiment.

FIG. 15 and FIG. 16 are plan views illustrating the correspondence relationship between the panel pixels and the video pixels, and the panel pixel having the lowest transmittance in the embodiment. Of these drawings, FIG. 15 illustrates the odd-numbered frame period and FIG. 16 illustrates the even-numbered frame period.

Note that in these drawings, a square frame indicated by a thick solid line is the active panel pixel Vp, and a square frame indicated by a thick broken line is the electrical parting panel pixel Dp.

In addition, 1 to 4 in the active panel pixel Vp or the electrical parting panel pixel Dp indicate the positions (1) to (4) in the unit periods f1-1 to f1-4 similarly to FIG. 12. A hatched portion indicates that black is displayed by a black signal having the lowest transmittance in the corresponding unit period, and a non-hatched portion indicates that video pixels are expressed in the corresponding unit period.

As illustrated in FIG. 15, in the odd-numbered frame period, the processing circuit 22 performs control such that the active panel pixels Vp express the video pixels and all the electrical parting panel pixels Dp display black. Note that the processing circuit 22 performing control such that the panel pixel displays black means that the processing circuit 22 outputs black data having the gray scale level corresponding to the lowest value, and the display control circuit 20 outputs an analog data signal obtained by converting the black data to the panel pixel.

For example, an active panel pixel Vp1 located at an upper left end expresses the video pixel C11 at the position (1) in the unit period f1-1, expresses the video pixel B11 at the position (2) in the unit period f1-2, expresses the video pixel A11 at the position (3) in the unit period f1-3, and expresses the video pixel D11 at the position (4) in the unit period f1-4.

In addition, for example, an electrical parting panel pixel Dp1 located at an upper left end in FIG. 15 displays black and functions as a part of the light shielding portion in the unit periods f1-1 to f1-4 as can be seen from hatching applied to the positions (1) to (4). Description of the other panel pixels will be omitted.

As illustrated in FIG. 16, in the even-numbered frame period, the processing circuit 22 causes the active panel pixel Vp to express the video pixel in the entire even-numbered frame period, or to express the video pixel in a part of the even-numbered frame period and to display black in a period other than the part. In addition, the processing circuit 22 performs control to cause the electrical parting panel pixel Dp to express the video pixel in a part of the even-numbered frame period, and display black in a period other than the part, or to cause the electrical parting panel pixel Dp to display black in the entire even-numbered frame period.

For example, the active panel pixel Vp1 located at the upper left end expresses the video pixel C11 at the position (5) in the unit period f2-1, expresses the video pixel B12 at the position (6) in the unit period f2-2, expresses the video pixel A22 at the position (7) in the unit period f2-3, and expresses the video pixel D21 at the position (8) in the unit period f2-4.

In addition, for example, an active panel pixel Vp2 located at a lower right end expresses the video pixel at the position (5) in the unit period f2-1, and displays black in the unit periods f2-2 to f2-4, as can be seen from hatching applied to the positions (6), (7), and (8).

In addition, for example, the electrical parting panel pixel Dp1 located at an upper left end displays black in the unit periods f2-1, f2-2, and f2-4 as can be seen from hatching applied to the positions (5), (6), and (8), and expresses the video pixel A11 at the position (7) in the unit period f2-3.

In addition, for example, an electrical parting panel pixel Dp2 located at a lower right end displays black and functions as a part of the light shielding portion in the unit periods f2-1 to f2-4 as can be seen from hatching applied to the positions (5) to (8). Description of the other panel pixels will be omitted.

In this way, the processing circuit 22 controls the active panel pixels Vp and the electrical parting panel pixels Dp.

According to the embodiment, since the video pixels in the one row on the upper end and the one column on the left end that are missing in the even-numbered frame period in the comparative example are also expressed by the panel pixels, it is possible to suppress lack of display.

Next, a second embodiment is described.

Figure 17:
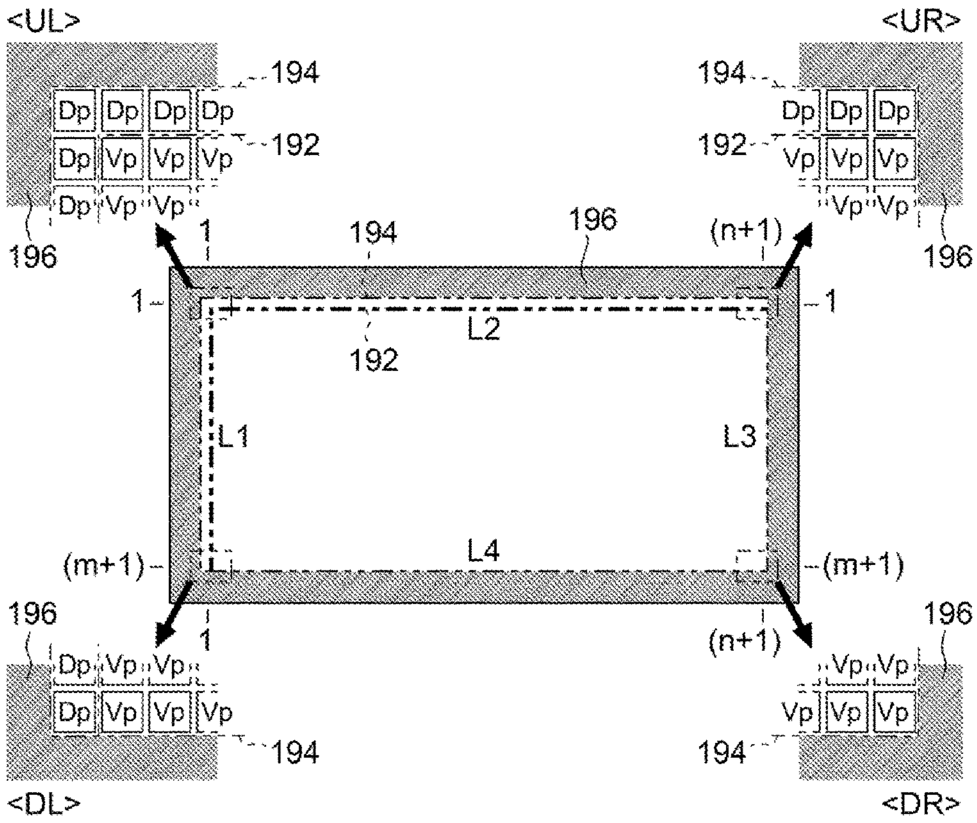
FIG. 17 is a plan view illustrating an array of panel pixels in a liquid crystal panel in a second embodiment.

FIG. 17 is a plan view illustrating an array of panel pixels in the liquid crystal panel 100 according to the second embodiment, and particularly, is an enlarged view illustrating the upper left end portion UL, the upper right end portion UR, the lower left end portion DL, and the lower right end portion DR of the array of the panel pixels.

In the second embodiment, the panel pixels are arrayed in a matrix of (m+1) rows and (n+1) columns, and compared with the first embodiment, the number of rows is reduced by one in a row direction and the number of columns is reduced by one in a column direction.

Specifically, in the second embodiment, the active panel pixels Vp are arrayed in a matrix of m rows and n columns excluding a first row and a first column.

The electrical parting panel pixels Dp are arrayed on two sides surrounding a region in which the active panel pixels Vp are arrayed in the m rows and n columns, specifically, in one column on the left side L1 and one row on the upper side L2.

In other words, in the second embodiment, unlike the first embodiment, the electrical parting panel pixel Dp is not provided in one column on the right side L3 and one row on the lower side L4.

In the second embodiment, a correspondence relationship between the video pixels and the panel pixels in the odd-numbered frame period and the even-numbered frame period is the same as that in the first embodiment illustrated in FIG. 11, and orders of the video pixels expressed by the panel pixels in the odd-numbered frame period and the even-numbered frame period are the same as those in the first embodiment illustrated in FIG. 12. Further, in the second embodiment, a relationship among the video pixels, the panel pixels, and the projection positions in the odd-numbered frame period and the even-numbered frame period is the same as that in the first embodiment illustrated in FIGS. 13 and 14.

Figure 18:
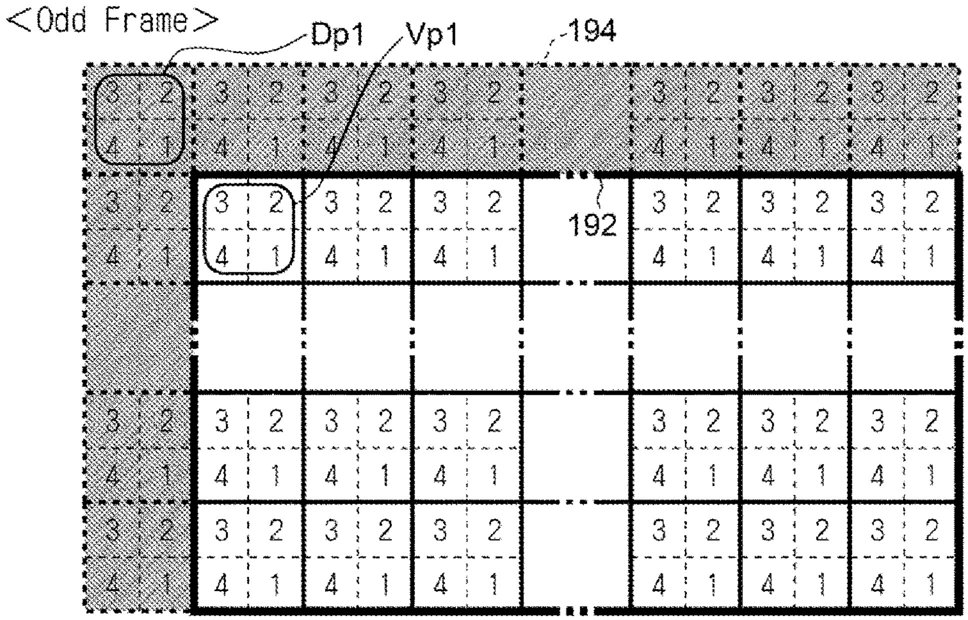
FIG. 18 is a diagram illustrating data signals supplied to the panel pixels in an odd-numbered frame period in the second embodiment.
Figure 19:
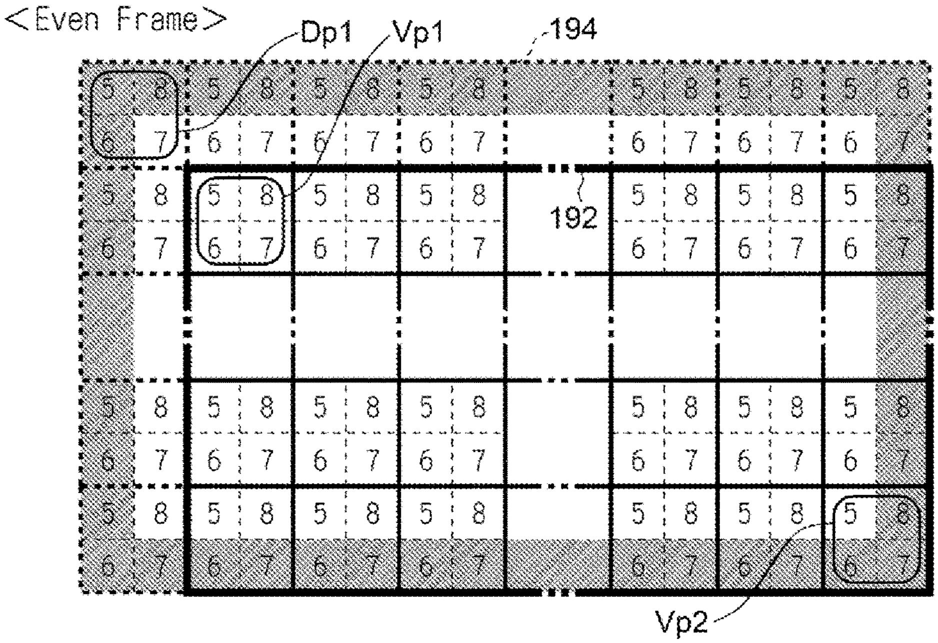
FIG. 19 is a diagram illustrating the data signals supplied to the panel pixels in an even-numbered frame period in the second embodiment.

FIG. 18 and FIG. 19 are plan views illustrating the correspondence relationship between the panel pixels and the video pixels, and the panel pixel having the lowest transmittance in the second embodiment. Of these drawings, FIG. 18 illustrates the odd-numbered frame period and FIG. 19 illustrates the even-numbered frame period.

Note that a square frame indicated by a thick solid line is the active panel pixel Vp, and a square frame indicated by a thick broken line is the electrical parting panel pixel Dp. Further, meanings of 1 to 4 and hatching in the active panel pixel Vp or the electrical parting panel pixel Dp are the same as those in FIGS. 15 and 16.

As illustrated in FIG. 18, in the odd-numbered frame period, the processing circuit 22 performs control such that the active panel pixels Vp express the video pixels and all the electrical parting panel pixels Dp display black.

For example, the active panel pixel Vp1 located at an upper left end expresses the video pixel C11 at the position (1) in the unit period f1-1, expresses the video pixel B11 at the position (2) in the unit period f1-2, expresses the video pixel A11 at the position (3) in the unit period f1-3, and expresses the video pixel D11 at the position (4) in the unit period f1-4.

In addition, the electrical parting panel pixel Dp1 located at an upper left end displays black in the unit periods f1-1 to f1-4 as can be seen from hatching applied to the positions (1) to (4). Description of the other panel pixels will be omitted.

As illustrated in FIG. 19, in the even-numbered frame period, the processing circuit 22 causes the active panel pixels Vp to express the video pixels in the entire even-numbered frame period, or to express the video pixels in a part of the even-numbered frame period and to display black in a period other than the part. In addition, the processing circuit 22 causes the electrical parting panel pixels Dp to express the video pixels in a part of the even-numbered frame period, and to display black in a period other than the part. In the second embodiment, unlike the first embodiment, the electrical parting panel pixel Dp displays black not in the entire even-numbered frame period.

For example, the active panel pixel Vp1 expresses the video pixel C11 at the position (5) in the unit period f2-1, expresses the video pixel B12 at the position (6) in the unit period f2-2, expresses the video pixel A22 at the position (7) in the unit period f2-3, and expresses the video pixel D21 at the position (8) in the unit period f2-4.

In addition, the active panel pixel Vp2 expresses the video pixel at the position (5) in the unit period f2-1, and displays black in the unit periods f2-2 to f2-4.

Further, for example, the electrical parting panel pixel Dp1 expresses the video pixels C11, B11, and D11 at the positions (5), (6), and (8) in the unit periods f2-1, 2-2, and 2-4, respectively, and displays black in the unit period f2-3.

In this way, the processing circuit 22 controls the active panel pixels Vp and the electrical parting panel pixels Dp.

According to the second embodiment, since the video pixels in the one row on the upper end and the one column on the left end that are missing in the even-numbered frame period in the comparative example are also expressed by the panel pixels, it is possible to suppress lack of display, as in the first embodiment. Further, according to the second embodiment, it is possible to reduce the number of the electrical parting panel pixels Dp among the panel pixels as compared with the first embodiment.

Next, a third embodiment will be described.

Figure 20:
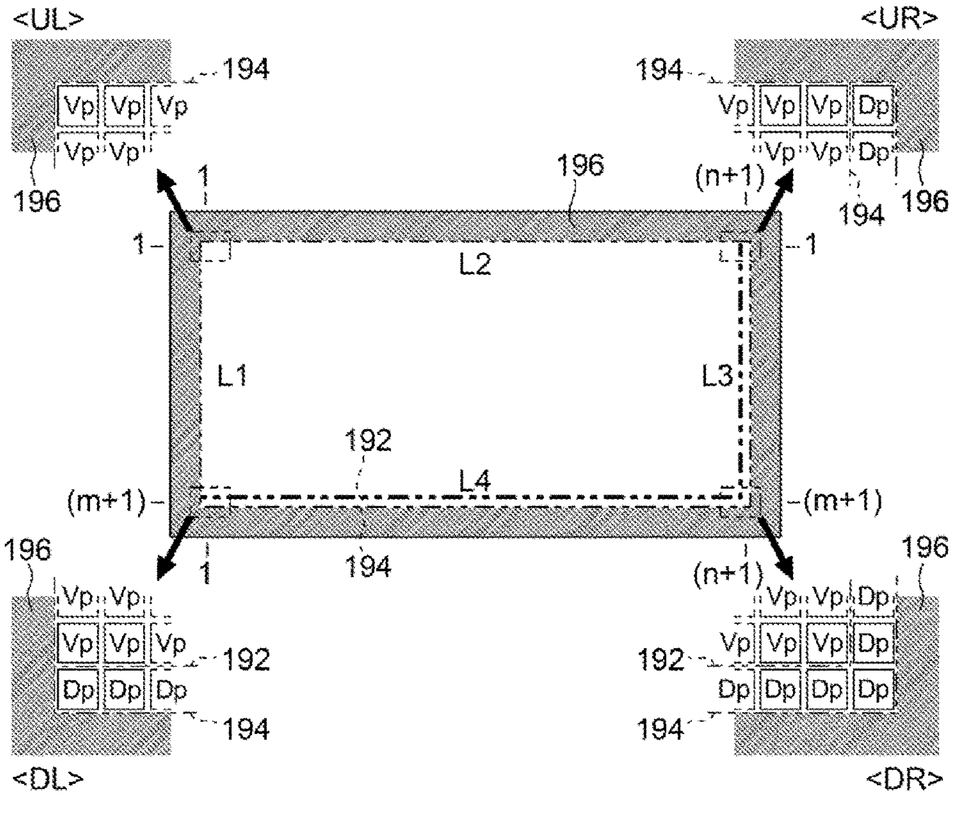
FIG. 20 is a plan view illustrating an array of panel pixels in a liquid crystal panel in a third embodiment.

FIG. 20 is a plan view illustrating an array of panel pixels in the liquid crystal panel 100 according to the third embodiment, and particularly, is an enlarged view illustrating the upper left end portion UL, the upper right end portion UR, the lower left end portion DL, and the lower right end portion DR of the array of the panel pixels.

In the third embodiment, as in the second embodiment, the panel pixels are arrayed in the matrix of (m+1) rows and (n+1) columns, and compared with the first embodiment, the number of rows is reduced by one in a row direction and the number of columns is reduced by one in a column direction. In the third embodiment, the active panel pixels Vp arrayed in a matrix of m rows and n columns are located closer to a left end and an upper end. The electrical parting panel pixels Dp are arrayed on two sides surrounding a region in which the active panel pixels Vp are arrayed in the m rows and n columns, specifically, in one column on the right side L3 and one row on the lower side L4.

In other words, in the third embodiment, unlike the second embodiment, the electrical parting panel pixel Dp is not provided in one column on the left side L1 and one row on the upper side L2.

In the third embodiment, a correspondence relationship between the video pixels and the panel pixels in the odd-numbered frame period and the even-numbered frame period is different from that in the first embodiment illustrated in FIG. 11.

Figure 21:
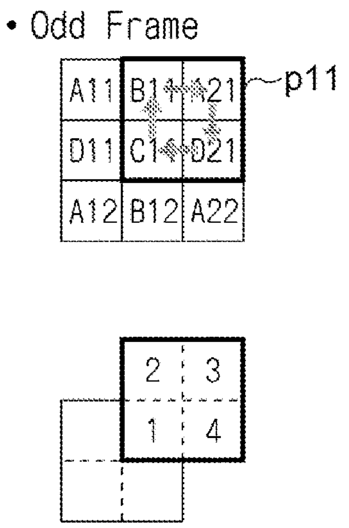
FIG. 21 is a diagram illustrating an order of the video pixels supplied to the panel pixel and positions of the video pixels corresponding to the panel pixel in the third embodiment.

Specifically, as illustrated in an upper field of FIG. 21, the panel pixel p11 expresses the video pixels C11, B11, A21, and D21 in the odd-numbered frame period, and expresses C11, B12, A12, and D11 in the even-numbered frame period. That is, in the third embodiment, 2 times 2 video pixels expressed by one panel pixel in the even-numbered frame period are shifted by one video pixel in the left direction and by one video pixel in the downward direction, from the 2 times 2 video pixels expressed by the panel pixel in the odd-numbered frame period.

A lower field of FIG. 21 is a diagram illustrating positions and an order of the video pixels C11, B11, A21, and D21 expressed by the panel pixel p11 in the unit periods f1-1 to f1-4 of the odd-numbered frame period, and 1 to 4 are assigned as reference signs.

For example, a position of 3 in the panel pixel p11 indicates that the panel pixel p11 expresses the video pixel A11 at the position of 3 in the upper field of FIG. 12 in the third unit period f1-3 when viewed through the two-frame period. Note that the reference signs are illustrated without parentheses in the drawings and with parentheses in the description. Similarly, in the unit periods f2-1 to f2-4 of the even-numbered frame period, positions of the video pixels C11, B12, A12, and D11 expressed by the panel pixel p11 and an order of 5 to 8 are illustrated.

Figure 22:
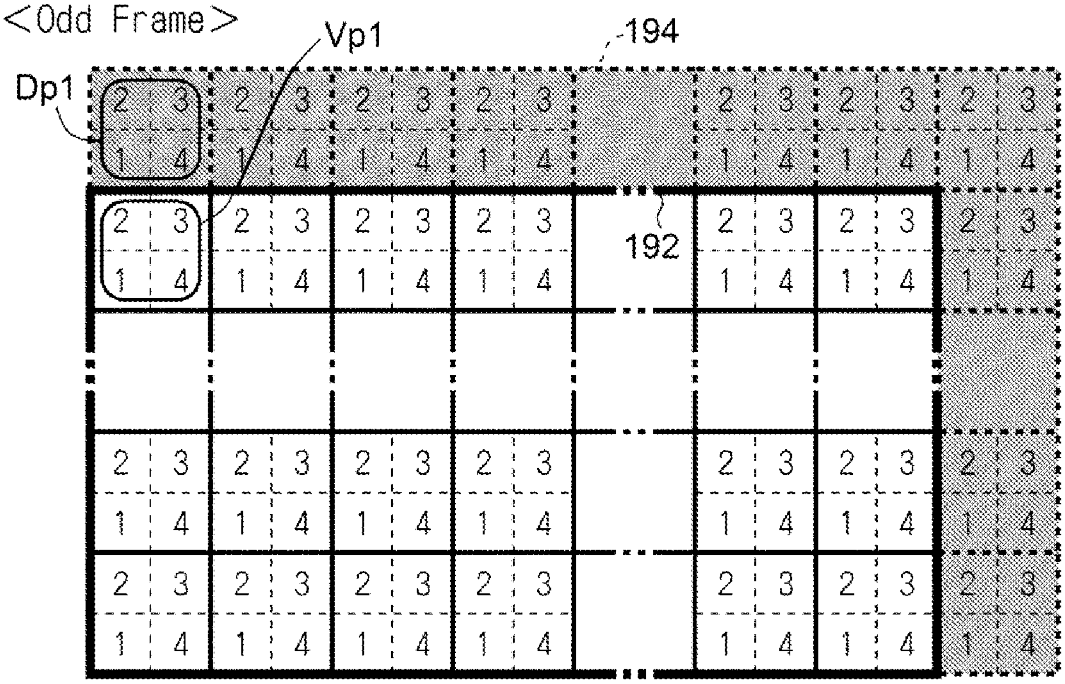
FIG. 22 is a diagram illustrating data signals supplied to the panel pixels in an odd-numbered frame period in the third embodiment.
Figure 23:
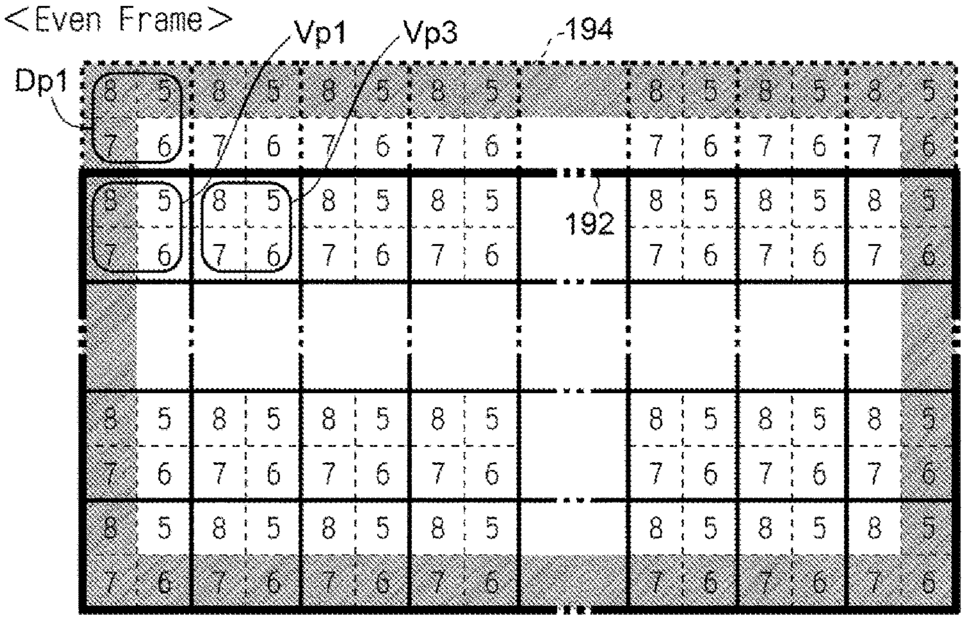
FIG. 23 is a diagram illustrating the data signals supplied to the panel pixels in an even-numbered frame period in the third embodiment.

FIG. 22 and FIG. 23 are plan views illustrating the correspondence relationship between the panel pixels and the video pixels, and the panel pixel having the lowest transmittance in the third embodiment. Of these drawings, FIG. 22 illustrates the odd-numbered frame period and FIG. 23 illustrates the even-numbered frame period.

Note that a square frame indicated by a thick solid line is the active panel pixel Vp, and a square frame indicated by a thick broken line is the electrical parting panel pixel Dp. Further, the meanings of 1 to 4 and the hatching in the active panel pixel Vp or the electrical parting panel pixel Dp are the same as those in FIGS. 15, 16, 18 and 19.

As illustrated in FIG. 22, in the odd-numbered frame period, the processing circuit 22 performs control such that the active panel pixels Vp express the video pixels and all the electrical parting panel pixels Dp display black.

For example, the active panel pixel Vp1 located at an upper left end expresses the video pixel C11 at the position (1) in the unit period f1-1, expresses the video pixel B11 at the position (2) in the unit period f1-2, expresses the video pixel A21 at the position (3) in the unit period f1-3, and expresses the video pixel D21 at the position (4) in the unit period f1-4.

In addition, the electrical parting panel pixel Dp1 located at an upper left end displays black in the unit periods f1-1 to f1-4 as can be seen from hatching applied to the positions (1) to (4).

As illustrated in FIG. 23, in the even-numbered frame period, the processing circuit 22 causes the video pixels to be expressed in a part of the even-numbered frame period, and causes black to be displayed in the period other than the part, or causes the active panel pixels Vp to express the video pixels in the entire even-numbered frame period.

In addition, in the second embodiment, the processing circuit 22 causes the electrical parting panel pixel Dp to express the video pixel in a part of the even-numbered frame period, and to display black in a period other than the part. The third embodiment is the same as the second embodiment in that the electrical parting panel pixel Dp displays black not in the entire even-numbered frame period unlike the first embodiment.

For example, the active panel pixel Vp1 expresses the video pixel C11 at the position (5) in the unit period f2-1, expresses the video pixel B12 at the position (6) in the unit period f2-2, and displays black in the unit periods f2-3 and f2-4.

Further, for example, an active panel pixel Vp3 to the right of the active panel pixel Vp1 expresses the video pixel C21 at the position (5) in the unit period f2-1, expresses the video pixel B22 at the position (6) in the unit period f2-2, expresses the video pixel A22 at the position (7) in the unit period f2-3, and expresses the video pixel D21 at the position (4) in the unit period f2-4.

In addition, for example, the electrical parting panel pixel Dp1 displays black in the unit periods f2-1, f2-3, and f2-4, and expresses the video pixel B11 at the position (6) in the unit period f2-2.

According to the third embodiment, since all the video pixels are expressed by the panel pixels, it is possible to suppress the lack of display as in the comparative example. Further, according to the third embodiment, it is possible to reduce the number of the electrical parting panel pixels Dp among the panel pixels as in the second embodiment.

In the first to third embodiments described above (hereinafter referred to as "embodiments and the like"), various modifications or applications are possible as described below.

In the embodiments and the like, when the panel pixel is used as the parting pixel, black is caused to be displayed where the gray scale level is zero, and the transmittance is the lowest, however, the transmittance may be set where the gray scale level corresponds to equal to or less than a threshold value (for example, a decimal value of "10"). That is, when the panel pixel is used as the parting pixel, the panel pixel may be brought into a dark state in which the transmittance is equal to or less than a certain degree, to function as a part of a light shielding portion and substantially as the parting pixel.

In addition, in the embodiments and the like, the configuration is adopted in which the one frame period is divided into the four unit periods. In other words, when k is the number of unit periods included in the one frame period, the description above is given using k=4 as an example. k is not limited to "4", and it is sufficient that k is equal to or greater than "2".

In the embodiments and the like, the period in which the levels of the control signals P_x and P_y supplied to the optical path shifting element 230 change is the rear end period corresponding to the vertical scanning period in each of the unit periods f1-1 to f1-4 and f2-1 to f2-4. However, as described above, the shift of the projection position by the optical path shifting element 230 may not be performed according to the levels of the control signals P_x and P_y, but may be accompanied by the time delay. In such a case, the level changes of the control signals P_x and P_y may be started in anticipation of the time delay, so that the image formed by the liquid crystal panel 100 in a unit period is shifted to a projection position corresponding to that unit period, for example.

For example, the following aspects of the present disclosure are understood from the embodiments illustrated above.

A projection-type display apparatus according to an aspect (Aspect 1) includes a liquid crystal panel including a plurality of panel pixels, an optical path shifting element configured to shift a position of a projection pixel projected from the plurality of panel pixels for each of k unit periods from a first unit period to a k-th unit period, where k is an integer equal to or greater than 2, included in one frame period, and a display control circuit configured to control the liquid crystal panel and the optical path shifting element, wherein the display control circuit supplies a data signal to the plurality of panel pixels per the unit period, supplies a signal based on pixel data of a video pixel constituting a video image, as the data signal, to a peripheral panel pixel arranged at a periphery among the plurality of panel pixels in a unit period as a part in one frame period of a first frame period and a second frame period, and supplies a signal having a gray scale level equal to or less than a threshold value as the data signal in a unit period other than the unit period as the part in the one frame period.

According to Aspect 1, it is possible to suppress lack of display in which the video pixel is not expressed by the panel pixel.

In a specific aspect (Aspect 2) of Aspect 1, the display control circuit, when the peripheral panel pixel expresses the video pixel in one unit period, supplies a pixel signal based on pixel data of the video pixel as the data signal in the one unit period, and when the peripheral panel pixel does not express the video pixel in another unit period, supplies a signal having the gray scale level equal to or less than a threshold value as the data signal to the peripheral panel pixel in the other unit period.

According to Aspect 2, when the peripheral panel pixel does not express the video pixel, a black signal is supplied to the peripheral panel pixel as the data signal in the other unit period, and the peripheral panel pixel functions as a part of a light shielding portion.

In a specific aspect (Aspect 3) of Aspect 1, the peripheral panel pixel is arranged at four peripheral sides of a rectangular region in which the plurality of panel pixels are arranged. According to Aspect 3, it is possible to suppress lack of display.

In a specific aspect (Aspect 4) of Aspect 1, the peripheral panel pixel is arranged at two sides adjacent to each other in a periphery of a rectangular region in which the plurality of panel pixels are arranged. According to Aspect 4, the number of panel pixels can be made smaller as compared with Aspect 3, with respect to the number of video pixels.

In a specific aspect (Aspect 5) of Aspect 1, one panel pixel displays a video pixel in which k video pixels expressed in a first unit period to a k-th unit period of the first frame period, and k video pixels expressed in a first unit period to a k-th unit period of the second frame period are arrayed point-symmetrically with respect to one common video pixel. According to Aspect 5, it is possible to reduce so-called flicker.

The projection-type display apparatus according to Aspect 1 can be grasped as a method for controlling a projection-type display according to Aspect 6. That is, a method for controlling the projection-type display apparatus according to Aspect 6 is a method for controlling a projection-type display apparatus including a liquid crystal panel including a plurality of panel pixels, an optical path shifting element that shifts a position of a projection pixel projected from the plurality of panel pixels for each of k unit periods from a first unit period to a k-th unit period, where k is an integer equal to or greater than 2, included in one frame period, and a display control circuit that controls the liquid crystal panel and the optical path shifting element, wherein the display control circuit supplies a data signal to the plurality of panel pixels per the unit period, supplies a pixel signal based on pixel data of a video pixel constituting a video image, as the data signal, to a peripheral panel pixel arranged at a periphery among the plurality of panel pixels in a unit period as a part in one frame period of a first frame period and a second frame period, and supplies a signal having a gray scale level equal to or less than a threshold value as the data signal in a unit period other than the unit period as the part in the one frame period.

What is claimed is:

1. A projection-type display apparatus, comprising:

a liquid crystal panel including a plurality of panel pixels;

an optical path shifting element configured to shift a position of a projection pixel projected from the plurality of panel pixels for each of k unit periods from a first unit period to a k-th unit period, where k is an integer equal to or greater than 2, included in one frame period; and a display control circuit configured to control the liquid crystal panel and the optical path shifting element, wherein the display control circuit supplies a data signal to the plurality of panel pixels per the unit period, supplies a signal based on pixel data of a video pixel constituting a video image, as the data signal, to a peripheral panel pixel arranged at a periphery among the plurality of panel pixels in a unit period as a part in one frame period of a first frame period and a second frame period, and supplies a signal having a gray scale level equal to or less than a threshold value as the data signal in a unit period other than the unit period as the part in the one frame period.

2. The projection-type display apparatus according to claim 1, wherein the display control circuit, when the peripheral panel pixel expresses the video pixel in one unit period, supplies a pixel signal based on pixel data of the video pixel as the data signal in the one unit period, and when the peripheral panel pixel does not express the video pixel in another unit period, supplies a signal having the gray scale level equal to or less than a threshold value as the data signal to the peripheral panel pixel in the other unit period.

3. The projection-type display apparatus according to claim 1, wherein the peripheral panel pixel is arranged at four peripheral sides of a rectangular region in which the plurality of panel pixels are arranged.

4. The projection-type display apparatus according to claim 1, wherein the peripheral panel pixel is arranged at two sides adjacent to each other in a periphery of a rectangular region in which the plurality of panel pixels are arranged.

5. The projection-type display apparatus according to claim 1, wherein one panel pixel displays a video pixel in which k video pixels expressed in a first unit period to a k-th unit period of the first frame period, and k video pixels expressed in a first unit period to a k-th unit period of the second frame period are arrayed point-symmetrically with respect to one common video pixel.

6. A method for controlling a projection-type display apparatus including a liquid crystal panel including a plurality of panel pixels, an optical path shifting element that shifts a position of a projection pixel projected from the plurality of panel pixels for each of k unit periods from a first unit period to a k-th unit period, where k is an integer equal to or greater than 2, included in one frame period, and a display control circuit that controls the liquid crystal panel and the optical path shifting element, the method comprising:

supplying a data signal to the plurality of panel pixels per the unit period, supplying a pixel signal based on pixel data of a video pixel constituting a video image, as the data signal, to a peripheral panel pixel arranged at a periphery among the plurality of panel pixels in a unit period as a part in one frame period of a first frame period and a second frame period, and supplying a signal having a gray scale level equal to or less than a threshold value as the data signal in a unit period other than the unit period as the part in the one frame period.

* * * * *